(12) United States Patent
Akizuki et al.

(10) Patent No.: US 10,831,482 B2
(45) Date of Patent: *Nov. 10, 2020

(54) ARITHMETIC PROCESSING APPARATUS AND CONTROL METHOD FOR ARITHMETIC PROCESSING APPARATUS

(71) Applicant: FUJITSU LIMITED, Kawasaki (JP)

(72) Inventors: Yasunobu Akizuki, Kawasaki (JP); Toshio Yoshida, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,816

(22) Filed: May 30, 2019

(65) Prior Publication Data
US 2019/0377576 A1    Dec. 12, 2019

(30) Foreign Application Priority Data
Jun. 6, 2018   (JP) .................................. 2018-108950

(51) Int. Cl.
*G06F 9/30*    (2018.01)
*G06F 12/1027*  (2016.01)

(52) U.S. Cl.
CPC ........ *G06F 9/30058* (2013.01); *G06F 9/3016* (2013.01); *G06F 12/1027* (2013.01)

(58) Field of Classification Search
CPC . G06F 12/1027; G06F 9/30058; G06F 9/3016
See application file for complete search history.

(56) References Cited

U.S. PATENT DOCUMENTS

| 5,717,946 A | 2/1998 | Satou et al. |
| 2007/0005895 A1 | 1/2007 | Fujisaki et al. |

(Continued)

FOREIGN PATENT DOCUMENTS

| JP | 7-114469 | 5/1995 |
| JP | 2001-265651 | 9/2001 |

(Continued)

OTHER PUBLICATIONS

Jann Horn, "Reading privileged memory with a side-channel", [online], [searched on May 9, 2018], internet <https://googleprojectzero.blogspot.jp/2018/01/reading-privileged-memory-with-side.html?m=1>, Jan. 3, 2018 (51 pages).

(Continued)

*Primary Examiner* — Zachary K Huson
(74) *Attorney, Agent, or Firm* — Fujitsu Patent Center

(57) ABSTRACT

An arithmetic processing apparatus includes a decoder, a first cache memory, a second cache memory and a processor. The processor performs a cache hit determination on the first cache memory in response to a memory access instruction, issues a data request to a second cache memory when the cache hit determination is a cache miss. When the memory access instruction is for a speculative execution speculatively executed in a state where a branch destination of a branch instruction is unestablished, the decoder issues the memory access instruction with a valid prohibition flag and an instruction identifier. In a case where the cache hit determination is the cache miss and the prohibition flag is valid, the processor does not issue the data request to the second cache memory. In a case where the cache hit determination is a cache hit, the processor acquires data from the first cache memory.

8 Claims, 21 Drawing Sheets

(56) References Cited

U.S. PATENT DOCUMENTS

| | | | |
|---|---|---|---|
| 2009/0300339 A1 | 12/2009 | Kado | |
| 2011/0219208 A1* | 9/2011 | Asaad | G06F 12/0862 712/12 |
| 2014/0129798 A1* | 5/2014 | Deutschle | G06F 12/1009 711/207 |
| 2014/0208075 A1* | 7/2014 | McCormick, Jr. | G06F 9/383 712/207 |
| 2016/0196210 A1* | 7/2016 | Noguchi | G06F 12/0811 711/122 |
| 2017/0053124 A1 | 2/2017 | Oyama | |
| 2019/0377575 A1* | 12/2019 | Maruyama | G06F 9/3016 |

FOREIGN PATENT DOCUMENTS

| | | |
|---|---|---|
| JP | 2007-11689 | 1/2007 |
| JP | 2007-52481 A | 3/2007 |
| JP | 2012-128656 | 7/2012 |
| JP | 2017-41145 A | 2/2017 |

OTHER PUBLICATIONS

Notice of Allowance dated Jun. 24, 2020 for copending U.S. Appl. No. 16/423,688, 9 pages.
Notice of Allowance dated Aug. 21, 2020 for copending U.S. Appl. No. 16/423,688, 12 pages. *Please note references cited herewith, were previously cited in an IDS filed on May 30, 2019 and cited by the Examiner on Jun. 25, 2020.*.

\* cited by examiner

ARITHMETIC PROCESSING APPARATUS AND CONTROL METHOD FOR ARITHMETIC PROCESSING APPARATUS

CROSS-REFERENCE TO RELATED APPLICATION

This application is based upon and claims the benefit of the prior Japanese Patent Application No. 2018-108950, filed on Jun. 6, 2018, the entire contents of which are incorporated herein by reference.

FIELD

The embodiments discussed herein are related to an arithmetic processing apparatus and a control method for the arithmetic processing apparatus.

BACKGROUND

An arithmetic processing apparatus is a processor or a CPU (central processing unit) chip. Hereinafter, the arithmetic processing apparatus will be referred to as a processor. The processor has various features in a structural aspect or a control aspect in order to efficiently execute instructions of a program. One of the features is a configuration or a control in which an instruction with a predicted branch destination is speculatively executed before a branch condition of a branch instruction is established.

In the case of a control in which a subsequent instruction is not executed until a branch destination of a branch instruction is established, the longer the time required until the branch destination is established, the longer the state where nothing is executable. Therefore, in a case where the instruction subsequent to the branch instruction is speculatively executed, when the branch destination is established and a branch prediction is correct, the performance is improved. When the branch prediction is incorrect, execution of all instructions subsequent to the branch instruction is canceled, and the instruction with a correct branch destination is executed so that a program normally operates. The reason the instruction for speculative execution may be canceled is because the speculatively executed instruction is not completed until the branch destination is established, and does not update an architecture register defined by an instruction set.

Related techniques are disclosed in, for example, Japanese Laid-open Patent Publication Nos. 07-114469, 2001-265651, 2007-011689, 2012-128656, and Jann Horn, "Reading privileged memory with a side-channel," [online], [searched on May 9, 2018], internet <https://googleprojectzero.blogspot.jp/2018/01/reading-privileged-memory-with-side.html?m=1>.

SUMMARY

According to an aspect of the embodiments, an arithmetic processing apparatus includes a decoder, a first cache memory, a second cache memory and a processor. The processor performs a cache hit determination on the first cache memory in response to a memory access instruction, issues a data request to a second cache memory when the cache hit determination is a cache miss. When the memory access instruction is for a speculative execution speculatively executed in a state where a branch destination of a branch instruction is unestablished, the decoder issues the memory access instruction with a valid prohibition flag and an instruction identifier. In a case where the cache hit determination is the cache miss and the prohibition flag is valid, the processor does not issue the data request to the second cache memory. In a case where the cache hit determination is a cache hit, the processor acquires data from the first cache memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

As described above, the speculatively executed instruction does not update an architecture register defined by an instruction set. However, when the speculatively executed memory access instruction causes a cache miss in a first level data cache, or a TLB cache miss in a first level translation lookaside buffer (TLB), a data request for a second level cache is made so that the state of the first level data cache or the first level TLB is updated. In this case, when the branch destination of the branch instruction is established with a failure in the branch prediction, the speculatively executed memory access instruction is canceled, but the updated state of the first level data cache or the first level TLB remains without cancelling.

It has been reported that a malicious program that uses the fact that the updated state of a cache remains due to the speculatively executed memory access instruction causes a vulnerability of the processor security. For example, a security problem is pointed out that while the branch destination of the branch instruction is unestablished, a malicious memory access instruction with an incorrect branch destination is speculatively executed, a protected memory area is stored in a first level data cache, and then, the contents of the protected memory area are revealed from the state of the first level data cache.

Figure 1:
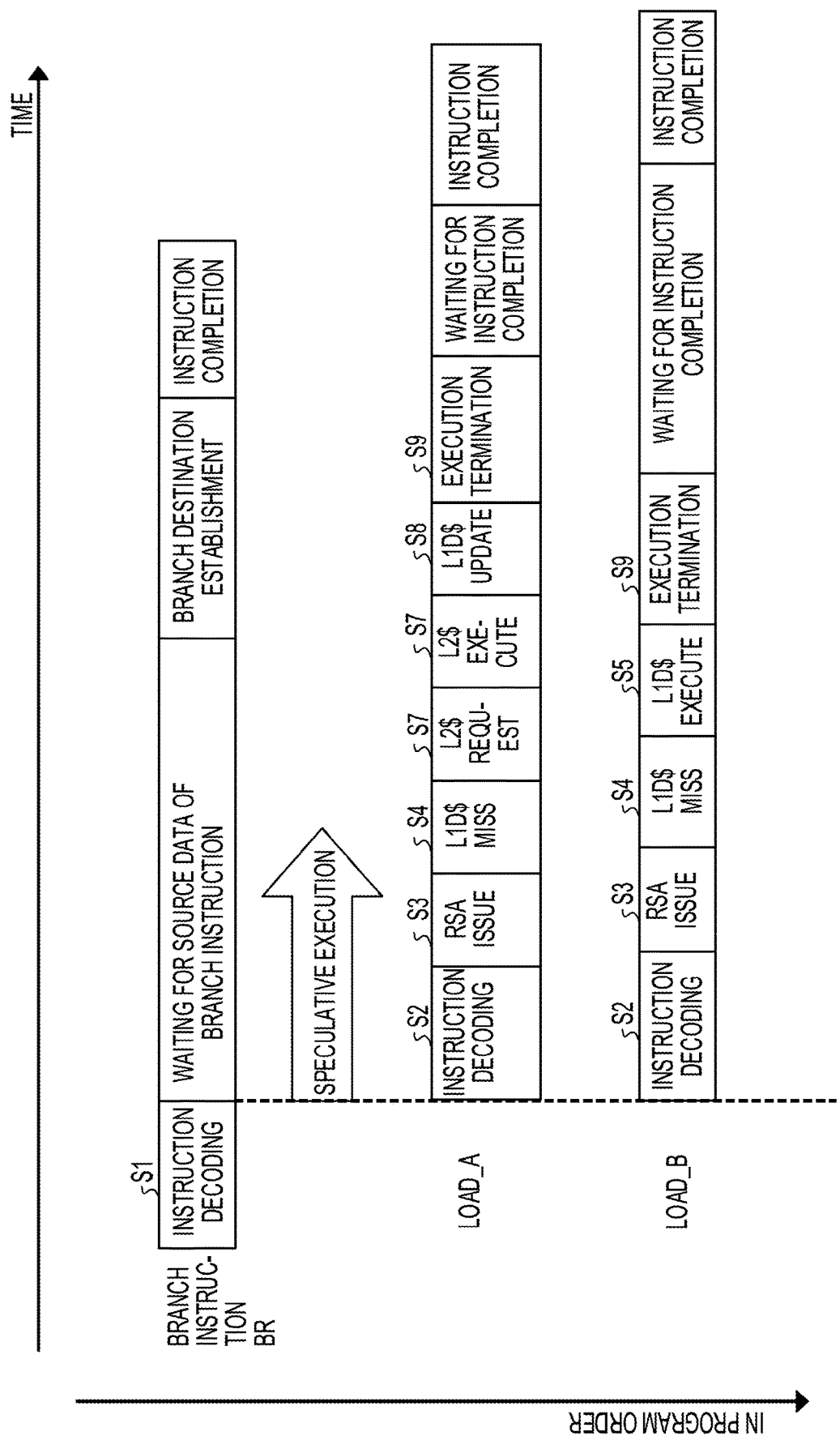
FIG. 1 is a view illustrating an example of an operation of a branch instruction, and subsequent memory access instructions for speculative execution.

FIG. 1 is a view illustrating an example of an operation of a branch instruction, and subsequent memory access instructions for speculative execution. In FIG. 1, the horizontal axis indicates time, and the vertical axis indicates the order of a program. In FIG. 1, a branch instruction BR, and a load instruction LOAD_A and a load instruction LOAD_B, which are subsequent thereto, are issued in an order.

Figure 2:
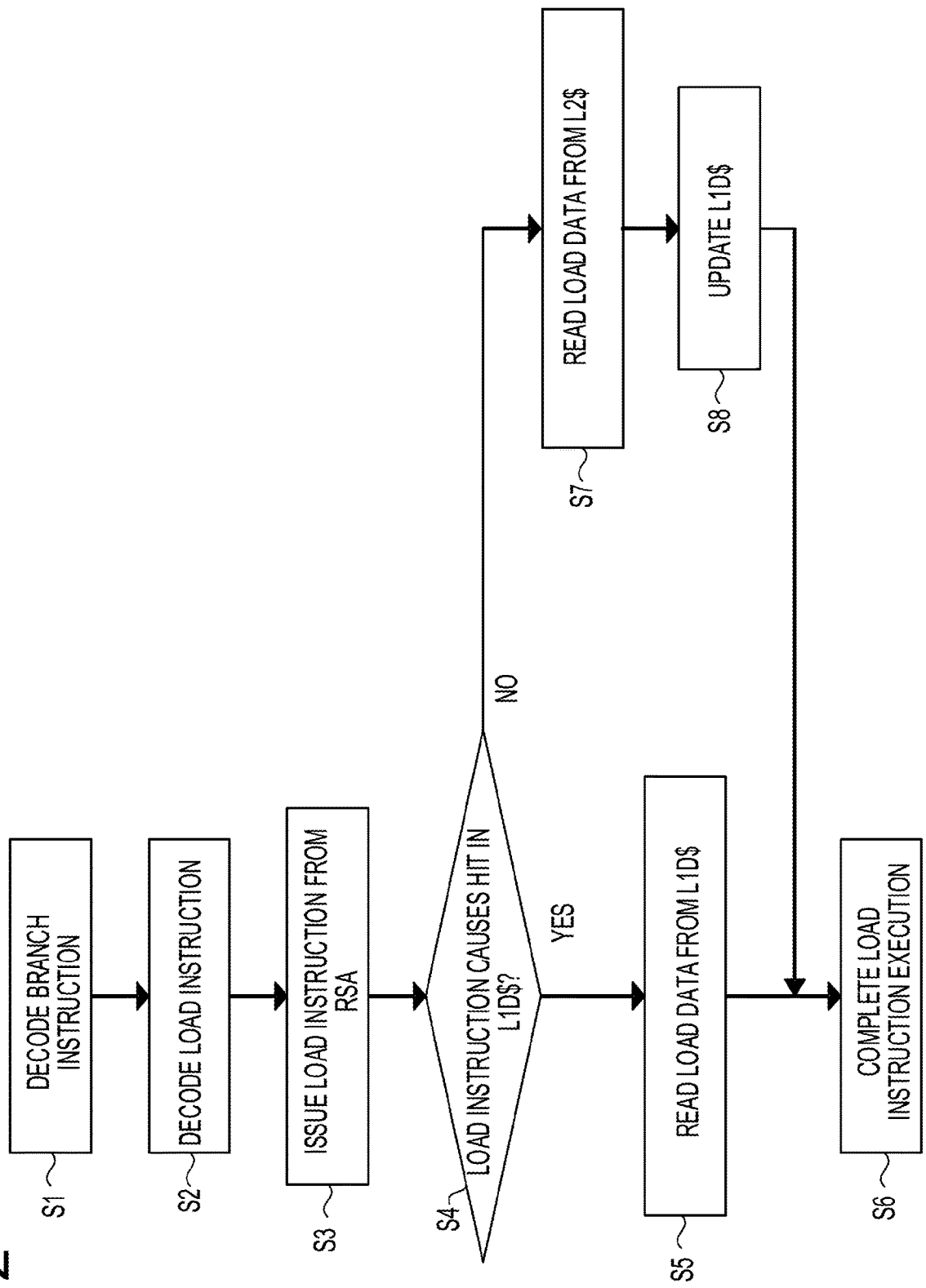
FIG. 2 is a flowchart of a processing of the branch instruction and the load instructions in FIG. 1.

FIG. 2 is a flowchart of a processing of the branch instruction and the load instructions in FIG. 1. Descriptions will be made on the processing of the branch instruction and the load instructions in FIG. 1, with reference to FIG. 2.

The branch instruction BR is decoded by an instruction decoder, and is executed as an executable branch instruction (S1). With respect to the branch instruction BR, after source data of the branch instruction is received from an arithmetic circuit, etc., a branch destination is established, and the instruction completion is made. An instruction, that is decoded and issued during an unestablished branch state until the branch destination is established after the branch instruction is decoded, becomes an instruction for speculative execution. Both the load instructions LOAD_A and LOAD_B in FIG. 1 are issued during the unestablished branch state, and thus are memory access instructions for speculative execution.

Both the first load instruction LOAD_A and the second load instruction LOAD_B are instruction-decoded (S2), and issued to a first level (hereinafter, referred to as level 1 (L1)) cache from a reservation station for address generation (RSA) that is a reservation station of a storage unit that processes a memory access instruction (S3). The load instruction LOAD_A is an instruction that causes cache miss in an L1 data cache L1D$, while the load instruction LOAD_B is an instruction that causes cache hit in the L1 data cache.

In this case, after decoded (S2) and issued from the RSA (S3), the first load instruction LOAD_A causes cache miss in the L1 data cache ("NO" in S4), and a data request is issued to a second level (hereinafter, referred to as L2) cache L2$. Then, the L2 cache executes the data request, reads load data, and responds to the L1 data cache (S7). The L1 data cache is updated by response data (S8), and instruction execution is terminated (S6). Then, after the instruction of the immediately preceding branch instruction BR is completed, an instruction completion processing of the load instruction LOAD_A is performed. The instruction completion processing is a control of completing instructions in order, and involves, for example, a processing of treating a register in which load data is stored, as an architecture register.

Meanwhile, after being issued from the RSA (S3), the second load instruction LOAD_B causes a cache hit in the L1 data cache ("YES" in S4), and then load data is read (S5), and the execution of the instruction is terminated (S6). Then, after the instruction completion processing of the immediately preceding load instruction LOAD_A, the instruction completion processing of the load instruction LOAD_B is performed.

Both the load instructions LOAD_A and LOAD_B illustrated in FIG. 1 correspond to a case where the branch prediction of the branch instruction BR is correct (success in the branch prediction). When the branch prediction of the branch instruction is incorrect (failure in the branch prediction), the instruction completion processing of the two speculatively executed load instructions LOAD_A and LOAD_B is not performed, and the two instructions are canceled. According to the cancelation of the load instructions due to a failure in the branch prediction, the load instructions for speculative execution in the RSA or in a cache control circuit, which are issued from the instruction decoder, are invalidated, and load data stored in a renaming register is also invalidated.

<Example of Processor Security Vulnerability>

Figure 21:
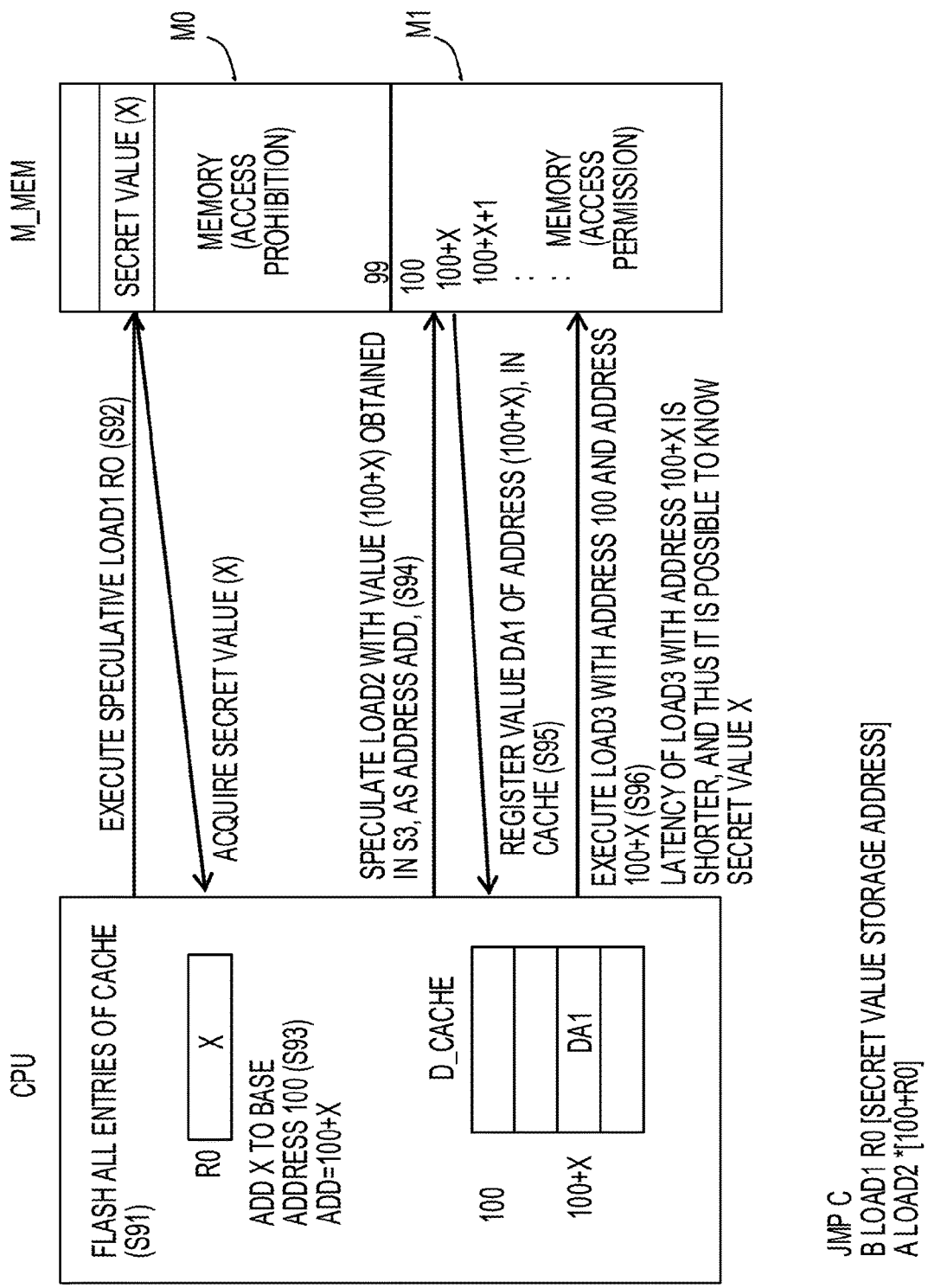
FIG. 21 is a view illustrating processor vulnerability.

FIG. 21 is a view illustrating a processor vulnerability. In some cases, the processor security vulnerability occurs when, for example, the following illegal instruction sequence is executed. JMP C//branch instruction to branch to branch destination C//B LOAD1 R0 [secret value storage address]//speculatively load with address in which secret value is stored, and store secret value in register R0//A LOAD2 *[100+R0]//speculatively load with address (secret value) in register R0//

In the instruction sequence, illegal load instructions "LOAD1" and "LOAD2" are added. In an illegal program, first, a cache memory is cleared, and shift to a privileged mode (OS mode) is made (S91). Then, a processor executes a branch instruction JMP C, in the privileged mode, and then speculatively executes a load instruction LOAD1 with a predicted branch destination B before a branch destination C of the branch instruction is established (S92). It is assumed that the predicted branch destination B is illegally registered as branch prediction information, and a correct branch destination of the branch instruction is C.

When the processor speculatively executes the load instruction LOAD1 with the incorrectly predicted branch destination B, a secret value X in a protected memory area which is permitted to be accessed only in the privileged mode is read, and stored in a register R0.

The secret value X is added to a start address "100" of the access permission area (S93), and a following load instruction A LOAD2 is speculatively executed (S94). Then, the load instruction LOAD2 with an address 100+X obtained by adding the secret value X in the register R0 to the start address [100] causes cache miss in an L1 cache, and a data request is issued to a L2 cache. By the data request, data DA1 at the address 100+X, in a memory area M1 that is permitted to be accessed in a user mode, is read. As a result, the data DA1 is registered in an entry of the address 100+X in the L1 cache memory of the processor, and update of the L1 cache is performed (S95).

Then, when the processor repeats a load instruction LOAD3 (not illustrated) while changing the address (S96), the access latency of a load instruction to the address 100+X at which the data DA1 is registered becomes shorter than that of another address 100, and thus contents of the address 100+X may be known. As a result, the security of the secret value X is lowered.

After the two load instructions LOAD1 and LOAD2 are speculatively executed, when the execution of the branch instruction JMP C is completed and the branch destination is established, it is determined that the branch prediction of the predicted branch destination B is wrong. As a result, the load instructions LOAD1 and LOAD2 speculatively executed in a pipeline circuit in the processor are invalidated, and the contents of the register R0 are cleared. Instructions for speculative execution are incomplete instructions, and the register R0 as a renaming register is cleared. However, since the cache memory is not cleared, the secret value X may be acquired on the basis of the latency of the cache memory.

As described above, one of causes of the processor vulnerability is that the load instructions LOAD1 and LOAD2 for speculative execution with the incorrectly predicted branch destination are executed prior to establishment of the branch destination of the branch instruction JMP, and a cache registration state is maintained by the execution of the LOAD2.

Outline of Present Embodiment

Figure 3:
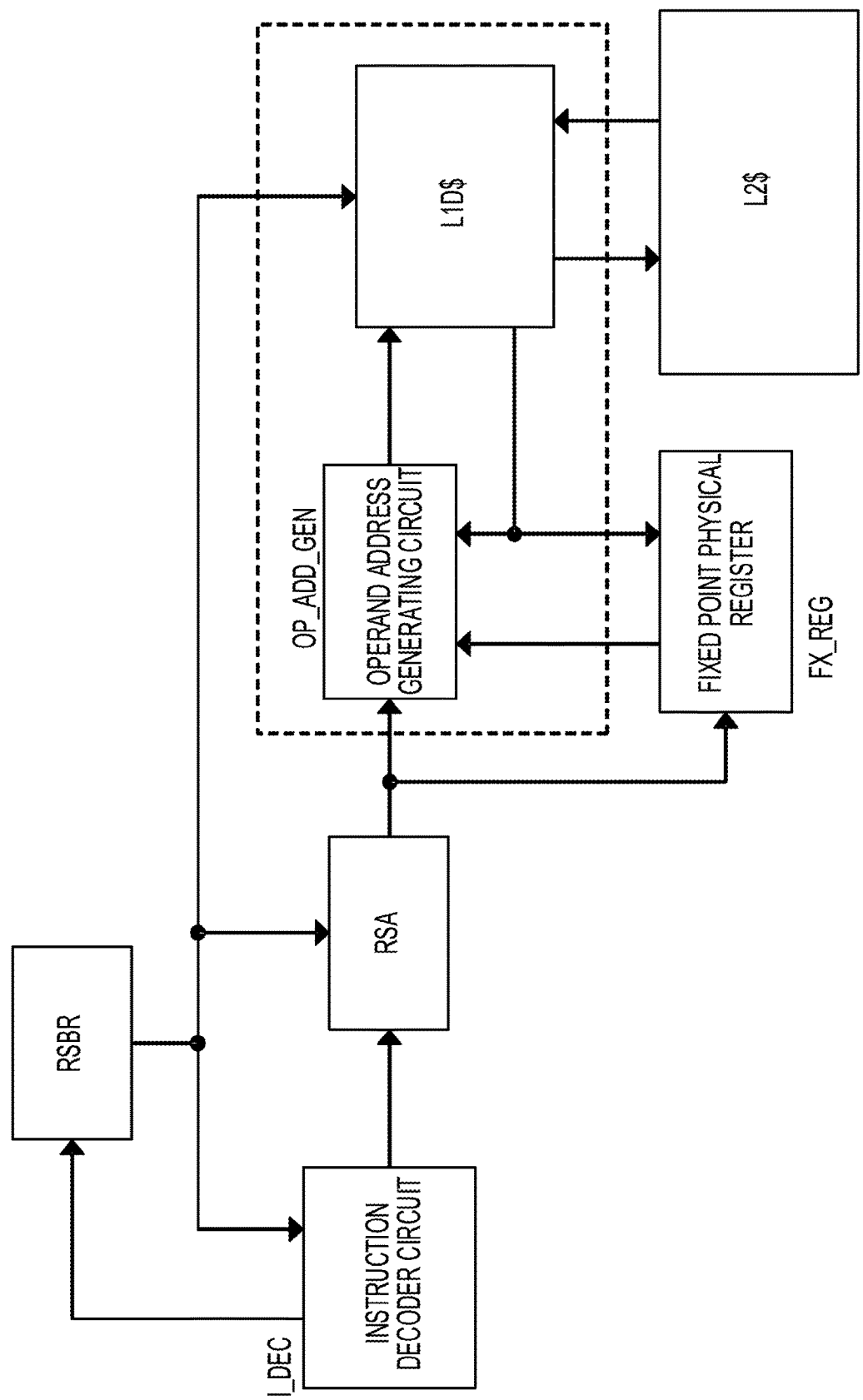
FIG. 3 is a view illustrating a schematic configuration of an arithmetic processing apparatus in the present embodiment.

FIG. 3 is a view illustrating a schematic configuration of an arithmetic processing apparatus in the present embodiment. The arithmetic processing apparatus illustrated in FIG. 3 includes an instruction decoder I_DEC constituting an instruction issuing circuit, an RSA that queues a memory access instruction issued by the instruction decoder, and a reservation station for branch (RSBR) that queues a branch instruction issued by the instruction decoder.

The arithmetic processing apparatus further includes an operand address generating circuit OP_ADD_GEN, and an L1 data cache L1D$ which constitute a storage unit SU. The L1 data cache L1D$ is connected to a L2 cache L2$. In a fixed point physical register file FX_REG, an address generated by the operand address generating circuit, or data as a response from the L1 data cache L1D$ is stored. A fixed point physical register includes a renaming register in which a processing result is stored before an instruction completion processing, and an architecture register in which a processing result is stored at the instruction completion processing.

Figure 4:
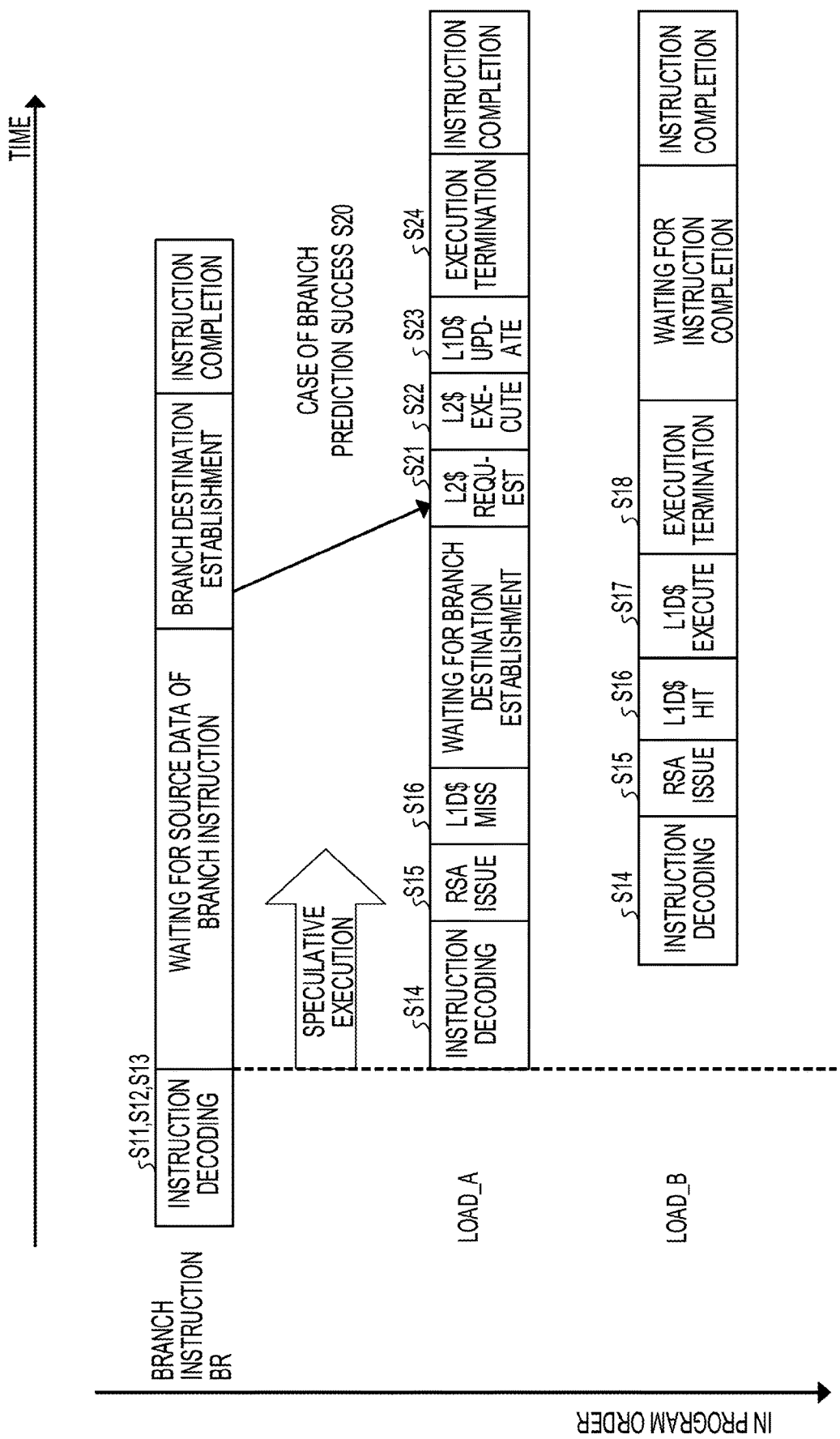
FIG. 4 is a view illustrating an example of an operation of a branch instruction and subsequent memory access instructions for speculative execution in the present embodiment.
Figure 5:
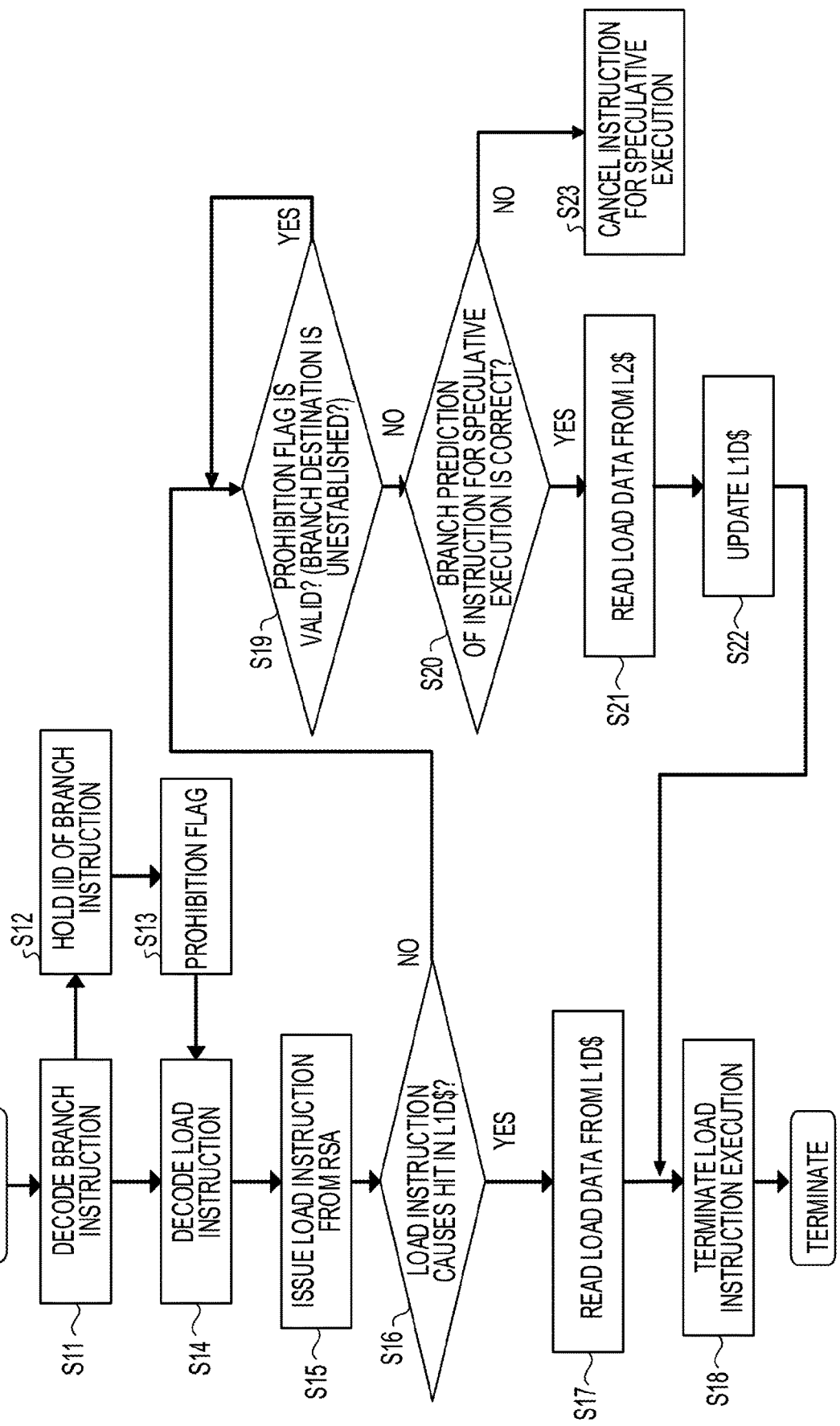
FIG. 5 is a flowchart of a processing of the branch instruction and load instructions in the present embodiment.

FIG. 4 is a view illustrating an example of an operation of a branch instruction and subsequent memory access instructions for speculative execution in the present embodiment. FIG. 5 is a flowchart of a processing of the branch instruction and load instructions in the present embodiment. The processing of the branch instruction and the load instructions in FIG. 4 will be described with reference to FIGS. 3 and 5.

First, when decoding a branch instruction (S11), the instruction decoder I_DEC holds an instruction identifier (IID: Instruction ID) allocated to the branch instruction (S12), and holds a prohibition flag that becomes valid during an unestablished branch state of the branch instruction (S13). Then, when decoding a load instruction as a memory access instruction, the instruction decoder adds the IID and the prohibition flag of the immediately preceding branch instruction, to the memory access instruction for speculative execution, which is executed during the unestablished branch state of the branch instruction (S14). The instruction decoder issues the memory access instruction to the RSA, and queues the memory access instruction in an instruction issue queue of the RSA.

When the memory access instruction becomes executable through, for example, a preparation of an operand address, the RSA issues the memory access instruction in the issue queue, to the storage unit SU (S15). The issued memory access instruction is sent to the L1 data cache L1D$ after an operand address is generated by the operand address generating circuit OP_ADD_GEN. The L1 data cache has a memory access queue in which the memory access instruction is queued. Here, the memory access instruction that is attached with the IID and the prohibition flag of the branch instruction is sent to the L1 data cache, and stored in the memory access queue.

When the memory access instruction (the load instruction) causes a data cache miss in an L1 data cache memory due to a non-registration of data of an access destination address, or causes an L1TLB cache miss in an L1TLB cache due to a non-registration of address conversion information of an access destination address ("NO" in S16), the L1 data cache L1D$ determines whether to issue a data request asking the L2 cache L2$ for data (S19). The L1TLB is a kind of cache memory in which a part of address conversion data in a main memory is registered.

Here, a data cache hit determination of determining whether the data of the access destination address is registered in the L1 data cache memory, and a TLB cache hit determination of determining whether the address conversion information of the access destination address is registered in the L1TLB are collectively referred to as a cache hit determination in the L1 data cache. Therefore, a cache miss in the L1 data cache indicates that either the data cache miss or the TLB cache miss has occurred.

When the prohibition flag of the memory access instruction is valid ("YES" in S19), the branch instruction is in a state where a branch destination is unestablished, and the memory access instruction is a speculative execution instruction. Therefore, in the present embodiment, the L1 data cache does not issue a data request to the L2 cache L2$. Then, the L1 data cache returns the memory access instruction to the memory access queue, and suppresses the issuance of the data request to the L2 cache until the branch destination of the branch instruction is established. By not issuing the data request to the L2 cache, the L1 data cache is suppressed from being updated with data acquired by the data request from the L2 cache. After all, when the prohibition flag is valid, the L1 data cache does not issue the data request to the L2 cache, and then the L1 data cache (or the L1TLB) is suppressed from being updated.

When the branch destination of the branch instruction is established ("NO" in S19), in a case where the branch prediction of the branch instruction is correct ("YES" in S20), the L1 data cache issues a data request to the L2 cache, and reads load data from the L2 cache L2$ (S21). Then, the L1 data cache L1D$ is updated with the load data. In a case where the branch destination is established and the branch prediction is correct, the prohibition flag added to the memory access instruction is invalidated. According to the invalidation of the prohibition flag, the L1 data cache issues the data request to the L2 cache in response to the memory access instruction.

Conversely, when the branch destination of the branch instruction is established ("NO" in S19), in a case where the branch prediction of the branch instruction is incorrect ("NO" in S20), the memory access instruction for a speculative execution becomes an instruction that is not executed. Thus, after the branch instruction is established, the L1 data cache invalidates and cancels all speculatively executed memory access instructions (S23).

Through the above control, the L1 data cache memory and the L1TLB cache in the L1 data cache are not updated by the memory access instruction speculatively executed during the unestablished branch state of the branch instruction. Thus, the processor vulnerability may be eliminated.

Meanwhile, when the memory access instruction for the speculative execution causes a cache hit (indicating that both data cache hit and TLB cache hit have occurred) in the L1 data cache ("YES" in S16), even though the memory access instruction for a speculative execution is executed, the L1 data cache L1D$ or the L1TLB cache is not updated. Therefore, the L1 data cache executes the memory access instruction for speculative execution as usual (S17).

As illustrated in FIG. 4, a first load instruction LOAD_A causes a cache miss (data cache miss or L1TLB miss occurs) in the L1 data cache, and the L1 data cache suppresses an issuance of a data request to the L2 cache. Then, the L1 data cache is suppressed from being updated, and stands by until a branch establishment of a branch instruction. When the branch establishment of the branch instruction is made and the branch prediction is correct, the L1data cache issues a data request to the L2 cache, and by load data acquired thereby, the L1 data cache or the L1TLB cache is updated.

Meanwhile, a second load instruction LOAD_B causes a cache hit (data cache hit or L1TLB hit) in the L1 data cache, and thus load data is read from the L1 data cache or address conversion is performed by the L1TLB cache similarly to a memory access instruction for non-speculative execution.

In the example of FIG. 4, since the branch establishment of the branch instruction is made and the branch prediction is correct, in response to the two load instructions LOAD_A and LOAD_B, the L1 data cache acquires data from the L2 cache, and the L1 data cache or the L1TLB cache is updated. When the branch prediction is incorrect, the load instruction LOAD_A is invalidated without a data request to the L2 cache, and the load instruction LOAD_B is also invalidated without an instruction completion processing although instruction execution is terminated.

When the memory access instruction is executed in the L1 data cache after the branch establishment of the branch instruction is made, since a prohibition flag of the memory access instruction is invalidated, the same cache control as that in the conventional art is performed. That is, the L1 data cache checks whether there is data on an access destination address (an operand address) in the L1 data cache memory and the L1TLB, and acquires the data from the L1 data cache memory when the hit occurs in both. Meanwhile, when a miss occurs in any one, the L1 data cache issues a data request asking the L2 cache for data. Then, when there is data as a response from the L2 cache, the L1 data cache memory or the L1TLB is updated with the response data.

Then, the data is acquired from the L1 data cache memory, execution termination of the memory access instruction is reported to a CSE, and the entry of the memory access instruction in the memory access queue is released.

<Processor of the Present Embodiment and Information Processing Apparatus Having the Same>

Figure 6:
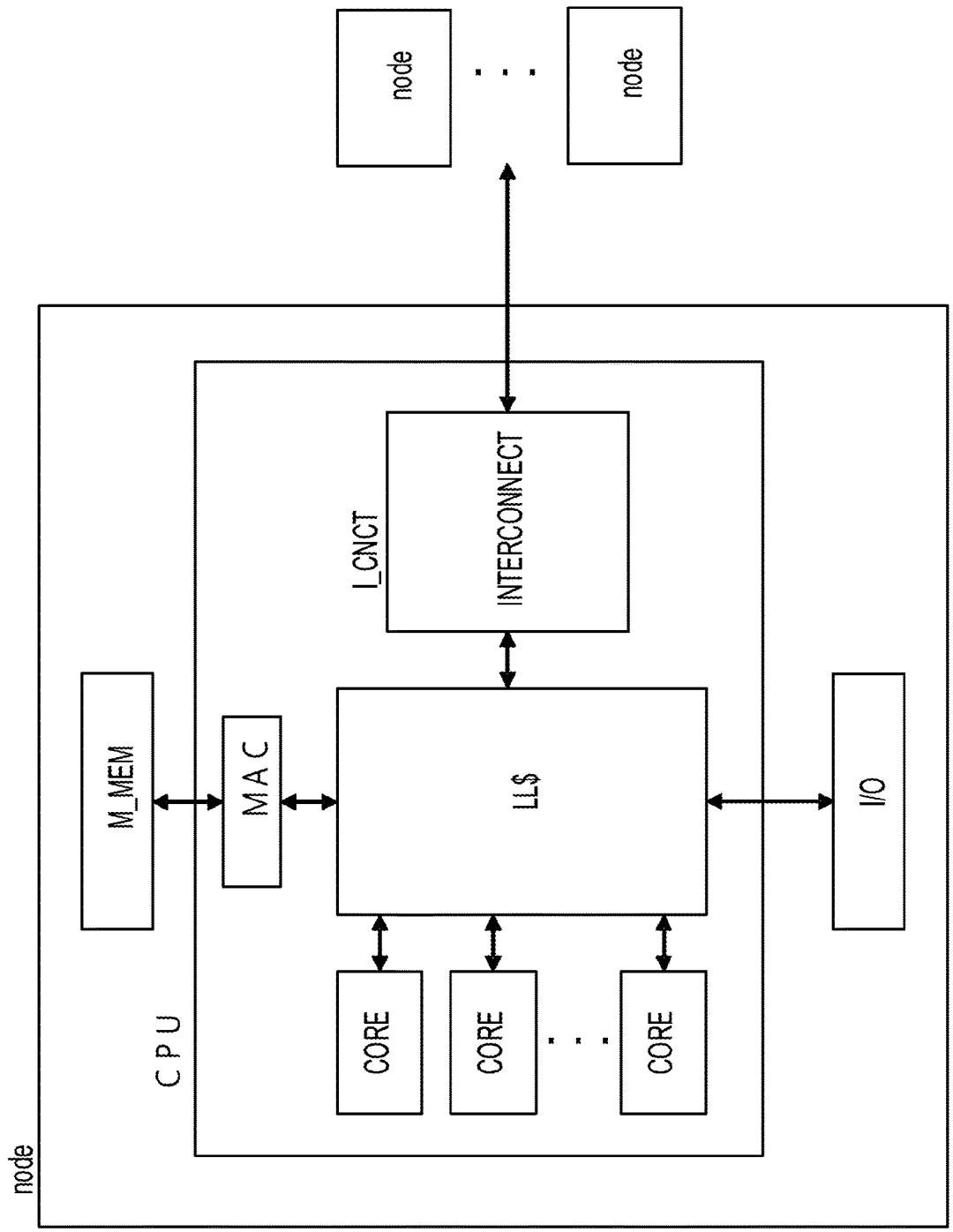
FIG. 6 is a schematic view of an information processing apparatus in which a processor of the present embodiment is mounted.

FIG. 6 is a schematic view of an information processing apparatus in which a processor of the present embodiment is mounted. The information processing apparatus, that is, a high performance computer (HPC) or a super computer, has a processor central processing unit (CPU), a main memory M_MEM, and an input/output unit I/O in each of a plurality of nodes. The processors CPU in respective nodes perform a packet communication with each other via the interconnects provided in the processors.

Figure 7:
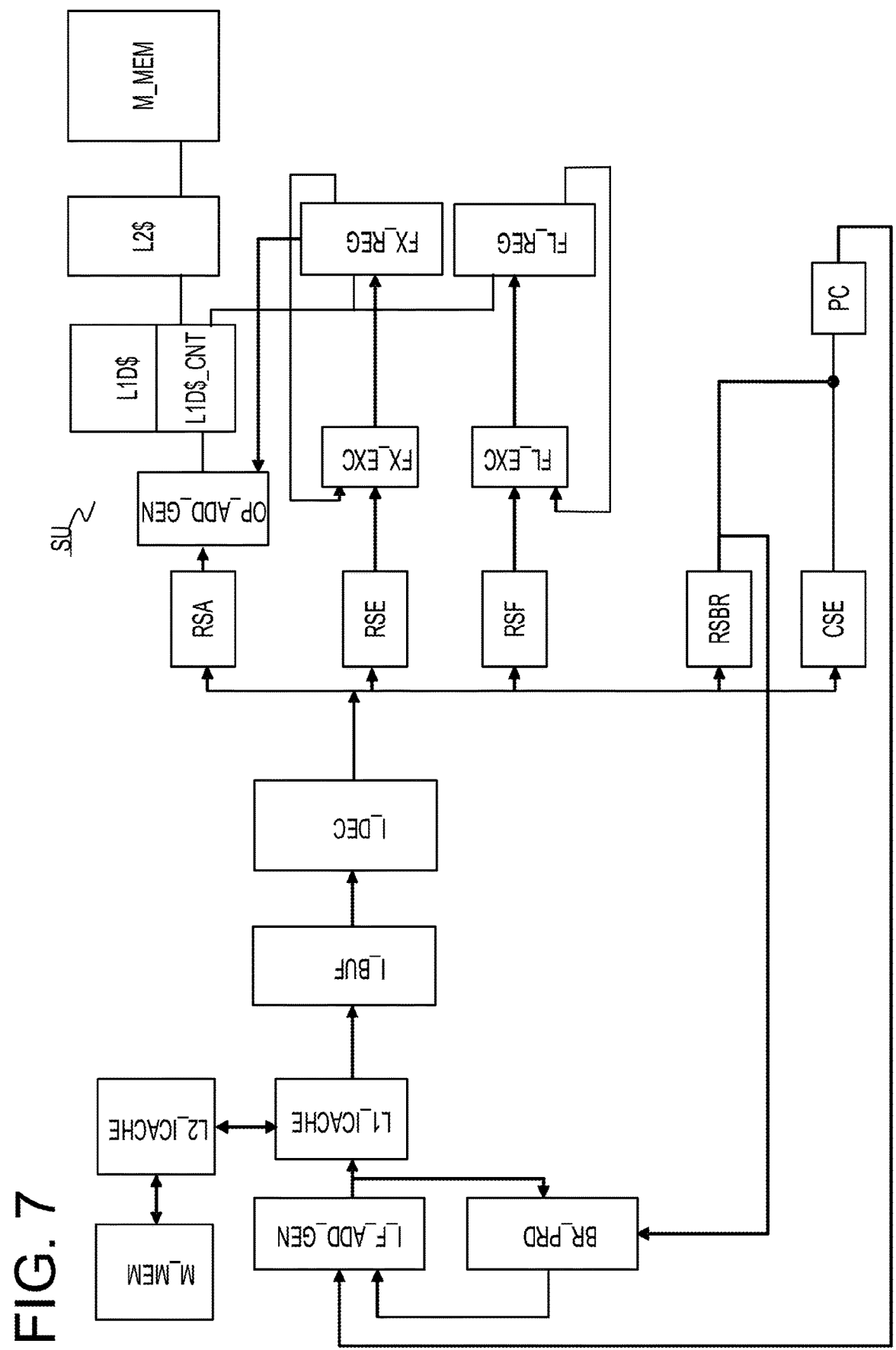
FIG. 7 is a view illustrating an example of a configuration of the processor in the present embodiment.

The processor CPU serving as an arithmetic processing apparatus includes a plurality of cores CORE_0 to CORE_n, a last level cache LL$ shared by the plurality of cores, a memory access control circuit MAC that controls the access to the memory, and an interconnect I_CNCT that controls the packet communication with the processors of other nodes. As described below, each core CORE includes an instruction issuing circuit, an arithmetic circuit, and an L1 cache. In FIG. 7, the last level cache LL$ is, for example, a second level cache or a L2 cache.

FIG. 7 is a view illustrating an example of a configuration of the processor in the present embodiment. The processor in FIG. 7 includes, as an instruction issuing circuit, an instruction fetch address generating circuit I_F_ADD_GEN, an L1 instruction cache L1_CACHE, an L2 instruction cache L2_CACHE, an instruction buffer I_BUF, an instruction decoder I_DEC, and reservation stations RSA, RSE, and RSF which are instruction issuing circuits that issue a plurality of instructions to arithmetic circuits. Further, the instruction issuing circuit includes a reservation station RSBR for a branch instruction, and a commit stack entry CSE.

The processor includes, as a plurality of arithmetic circuits, a storage unit SU, a fixed point arithmetic circuit FX_EXC, and a floating point arithmetic circuit FL_EXC. Each of the arithmetic circuits is provided as a single circuit or a plurality of circuits.

The storage unit SU includes an operand address generating circuit OP_ADD_GEN that includes an addition/subtraction circuit for address calculation, and an L1 data cache L1_DCACHE. The L1 data cache includes, in addition to a cache memory, an L1 cache control circuit L1$_CNT that performs a control on the cache memory.

Each of the fixed point arithmetic circuit FX_EXC and the floating point arithmetic circuit FL_EXC includes, for example, an addition/subtraction circuit, a logical operation circuit, a multiplication circuit, and etc. The floating point arithmetic circuit includes a number of arithmetic circuits corresponding to the width of the SIMD (single instruction multiple data) so that, for example, the SIMD operations may be performed. The processor has a fixed point register file FX_REG, and a floating point register file FL_REG. which store processing results of the arithmetic circuits. These register files have a plurality of registers, some of which are renaming registers in which processing results are stored before an instruction completion processing, and architecture registers in which processing results are stored at the time of an instruction completion processing. The architecture register is a register accessible from software, and is a general purpose register.

The processor further includes the L2 cache L2$ shared by the plurality of cores, which is connected to the main memory M_MEM via a memory controller (not illustrated). The L2 instruction cache L2_ICACHE is also connected to the main memory M_MEM via the memory controller. The L2 cache L2$ is the last level cache described above.

Hereinafter, the overall configuration of the processor will be schematically described according to the flow of an instruction processing. The instruction fetch address generating circuit I_F_ADD_GEN generates a fetch address, and temporarily stores a fetch instruction in the instruction buffer I_BUF from the L1 instruction cache L1_ICACHE in an order of execution in a program (in-order). Then, the fetch instructions in the instruction buffer are input, in an in-order, to the instruction decoder I_DEC, and executable instructions (execution instructions) attached with information required for execution are generated through decoding.

Then, the execution instructions generated by the instruction decoder are queued and stored in an in-order in a queue structure storage called a reservation station. The reservation station is an execution queue that stores the execution instructions in a queue, and is provided for each arithmetic circuit that executes instructions.

The reservation station includes, for example, the reservation station for address generation (RSA) provided for the storage unit SU including the L1 data cache L1$, the reservation station for execution (RSE) provided for the fixed point arithmetic circuit FX_EXC, and the reservation station for floating point (RSF) provided for the floating point arithmetic circuit FL_EXC. The reservation station further includes the reservation station for Branch (RSBR) corresponding to a branch prediction unit BR_PRD.

Hereinafter, the reservation station will be properly referred to as an RS as an abbreviation.

Then, the execution instructions queued in each RS are issued to the arithmetic circuit and executed by the arithmetic circuit, in a random order (out-of-order) from one whose instruction execution conditions are satisfied, depending on whether an input operand required for instruction execution is readable from a general purpose register file by a completion processing of an arithmetic processing of a preceding instruction (whether read after write (RAW) constraint is satisfied), or whether circuit resources of the arithmetic circuit are available.

Meanwhile, the instruction decoder I_DEC allocates the instruction identifiers (Instruction Identification: IID) to the execution instructions generated by decoding the fetch instructions, in an order of execution in the program, and transmits the execution instructions in an in-order, to the commit stack entry CSE (hereinafter, referred to as a CSE). The CSE includes a queue structure storage that stores the transmitted execution instructions, in an in-order, and an instruction commit processing unit that performs a commit processing (completion processing) of each instruction on the basis of information, and etc. in the queue, in response to an instruction processing completion report from a pipeline circuit of the arithmetic circuit. Therefore, the CSE is a completion processing circuit that performs an instruction completion processing.

The execution instructions are stored in an in-order in the queue in the CSE, and wait for the instruction processing completion report from each arithmetic circuit. Then, as described above, the execution instructions are transmitted, in an out-of-order, from each RS to the arithmetic circuit, and executed by the arithmetic circuit. Thereafter, when the instruction processing completion report is sent to the CSE, the instruction commit processing unit of the CSE performs a completion processing on an execution instruction corresponding to the processing completion report among the instructions which are stored in the queue and wait for the processing completion report, in an in-order, and updates circuit resources such as registers. The CSE increments a program counter PC at the completion processing.

With respect to a branch instruction queued in the RSBR for a branch processing, the branch prediction is made by the branch prediction unit BR_PRD, and the instruction fetch address generating circuit I_F_ADD_GEN generates a branch destination address on the basis of a prediction result. As a result, an instruction based on the branch prediction is read from the instruction cache, and is speculatively executed by the arithmetic circuit via the instruction buffer and the instruction decoder. The RSBR executes branch instructions, in an in-order. Before a branch destination of the branch instruction is established, the branch destination is predicted, and speculative execution of an instruction with the predicted branch destination is performed. When the branch prediction is correct, the processing efficiency is increased, whereas when the branch prediction is incorrect, the speculatively executed instruction is canceled in the pipeline, and thus the processing efficiency is lowered.

<Instruction Decoder>

Figure 8:
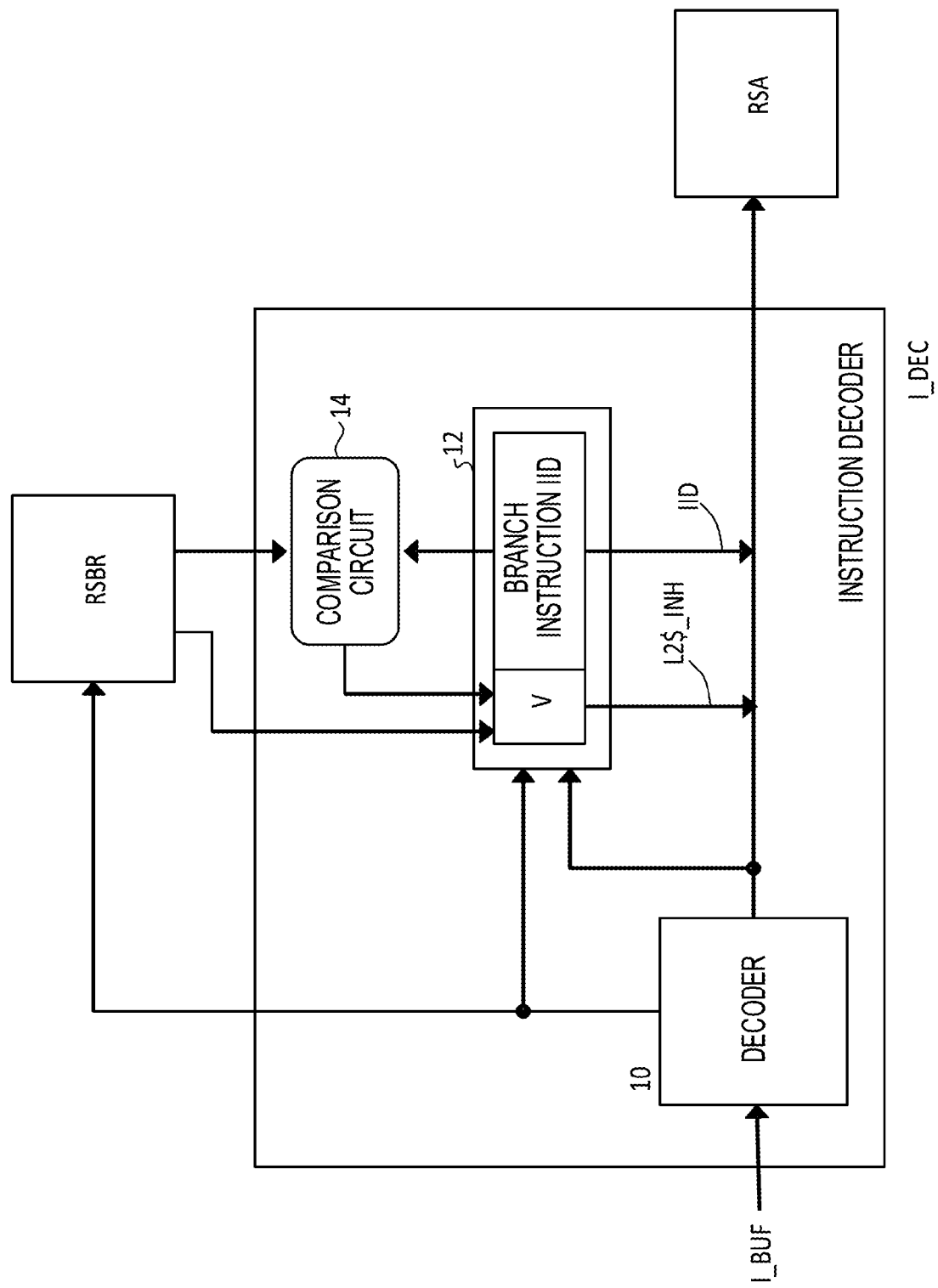
FIG. 8 is a view illustrating an example of a configuration of an instruction decoder in the present embodiment.

FIG. 8 is a view illustrating an example of a configuration of the instruction decoder in the present embodiment. Instructions in the instruction buffer I_BUF are input, in an in-order, to the instruction decoder I_DEC, and then, the instruction decoder I_DEC decodes the instructions, issues a branch instruction to the RSBR, and issues a memory access instruction to the RSA.

The instruction decoder I_DEC includes a decoder 10 that decodes a fetch instruction, a branch instruction buffer 12 that stores an instruction identifier IID of a branch instruction and a valid bit V thereof, and a comparison circuit 14. When a branch instruction is decoded, the decoder 10 in the instruction decoder allocates an IID to the branch instruction, stores the IID in the branch instruction buffer 12, and sets the valid bit V as valid "1." Then, the decoder 10 issues the branch instruction to the RSBR.

When a branch destination of the branch instruction is established, the RSBR transmits a branch establishment notification signal indicating branch establishment and an IID of the branch instruction, to the instruction decoder I_DEC. The comparison circuit 14 in the instruction decoder compares the IID in the branch instruction buffer 12 to the IID added to the branch establishment notification from the RSBR, and then sets the valid bit V in the branch instruction buffer 12 as invalid "0," when both are matched. Accordingly, a branch establishment state is made.

Then, when a branch instruction is newly decoded, the decoder 10 updates the branch instruction buffer 12 with an instruction identifier IID of the branch instruction. In this manner, in the branch instruction buffer 12, an IID of a lastly decoded branch instruction, and a valid bit V indicating whether the branch state is unestablished or established (whether the valid bit V is "1" or "0") are stored.

The instruction decoder adds a prohibition flag L2$_INH and an instruction identifier IID (Instruction ID) of an unestablished branch instruction, to a memory access instruction issued during an unestablished branch state of the branch instruction, and issues the memory access instruction to the RSA. Here, the prohibition flag L2$_INH prohibits an issuance of a data request to the L2 cache at the time of cache miss in the L1 data cache, and thereby prohibits an update of the L1 data cache. The prohibition flag L2$_INH is the same as the valid bit V in the branch instruction buffer 12.

Meanwhile, the instruction decoder adds an invalid prohibition flag "0" on the basis of a valid signal "0" invalidated by branch establishment, to a memory access instruction issued after branch establishment of a branch instruction, and issues the memory access instruction to the RSA. When the memory access instruction is executed, in a case where cache miss occurs in the L1 data cache, a data request asking the L2 cache for data is issued, the data is acquired from the L2 cache, and the L1 data cache is updated.

As described above, the instruction decoder I_DEC adds a valid prohibition flag L2$_INH and an IID of a branch instruction to a memory access instruction issued during an unestablished branch state of the branch instruction, and issues the memory access instruction to the RSA. Meanwhile, the instruction decoder I_DEC adds an invalid prohibition flag L2$_INH to a memory access instruction issued after branch establishment, and issues the memory access instruction to the RSA.

As described below, a memory access instruction is stored in the entry created in an issue queue of the RSA. When the RSA issues the memory access instruction, the issued memory access instruction is stored in the entry created in a memory access queue in the L1 cache control circuit. Then, when the RSBR transmits a branch establishment notification signal of a branch instruction together with an instruction identifier IID of the branch instruction to the RSA and the L1 cache control circuit, in a case where the branch prediction is correct, a prohibition flag L2$_INH of the memory access instruction stored in the issue queue in the RSA is invalidated, and a prohibition flag L2$_INH of the memory access instruction stored in the memory access queue in the L1 cache control circuit is also invalidated.

<RSA>

Figure 9:
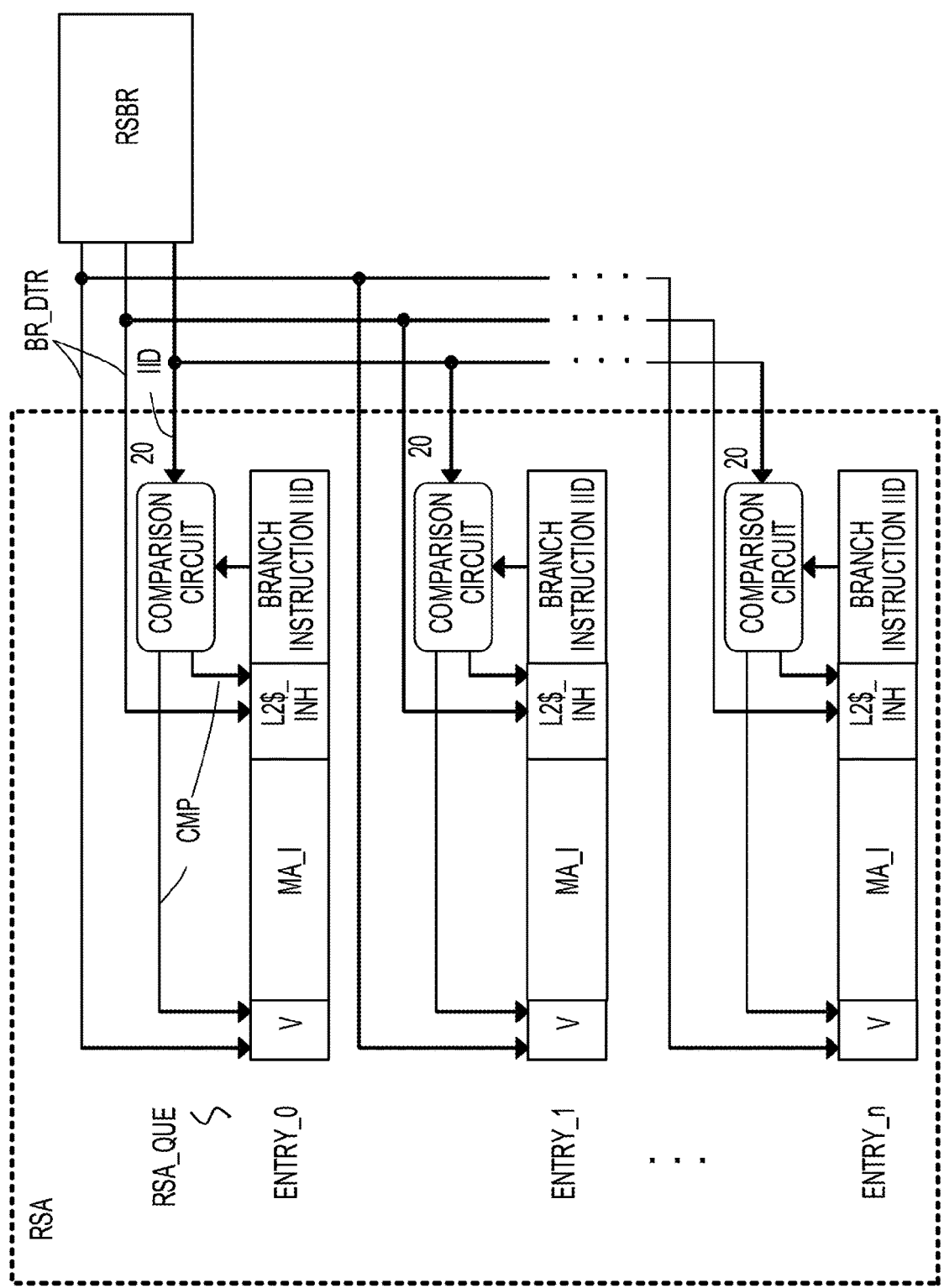
FIG. 9 is a view illustrating an example of a configuration of an RSA.

FIG. 9 is a view illustrating an example of a configuration of the RSA. The RSA has an issue queue RSA_QUE, generates entries ENTRY_0 to ENTRY_n in the issue queue, and registers and queues memory access instructions MA_I issued from the instruction decoder, in the entries. Information registered (stored) in each entry includes a valid bit V of the entry, information of a memory access instruction MA_I (the type of load or store, information on an access destination address, and etc.), a prohibition flag L2$_INH, and an IID of a branch instruction.

Each entry in the issue queue in the RSA is issued to the storage unit SU when data for generating an operand address is prepared and resources of the operand address generating circuit or the L1 data cache become available. While each entry is waiting to be issued, when a branch destination of a branch instruction corresponding to an IID in the entry is established, a branch establishment notification BR_DTR, together with an IID of the branch instruction whose branch destination is established and information indicating whether the branch prediction is successful or not, is sent from the RSBR to all entries. In each entry, a comparison circuit 20 is provided, which compares the IID of the branch establishment notification BR_DTR to the IID in the entry, and outputs a comparison result CMP.

Figure 10:
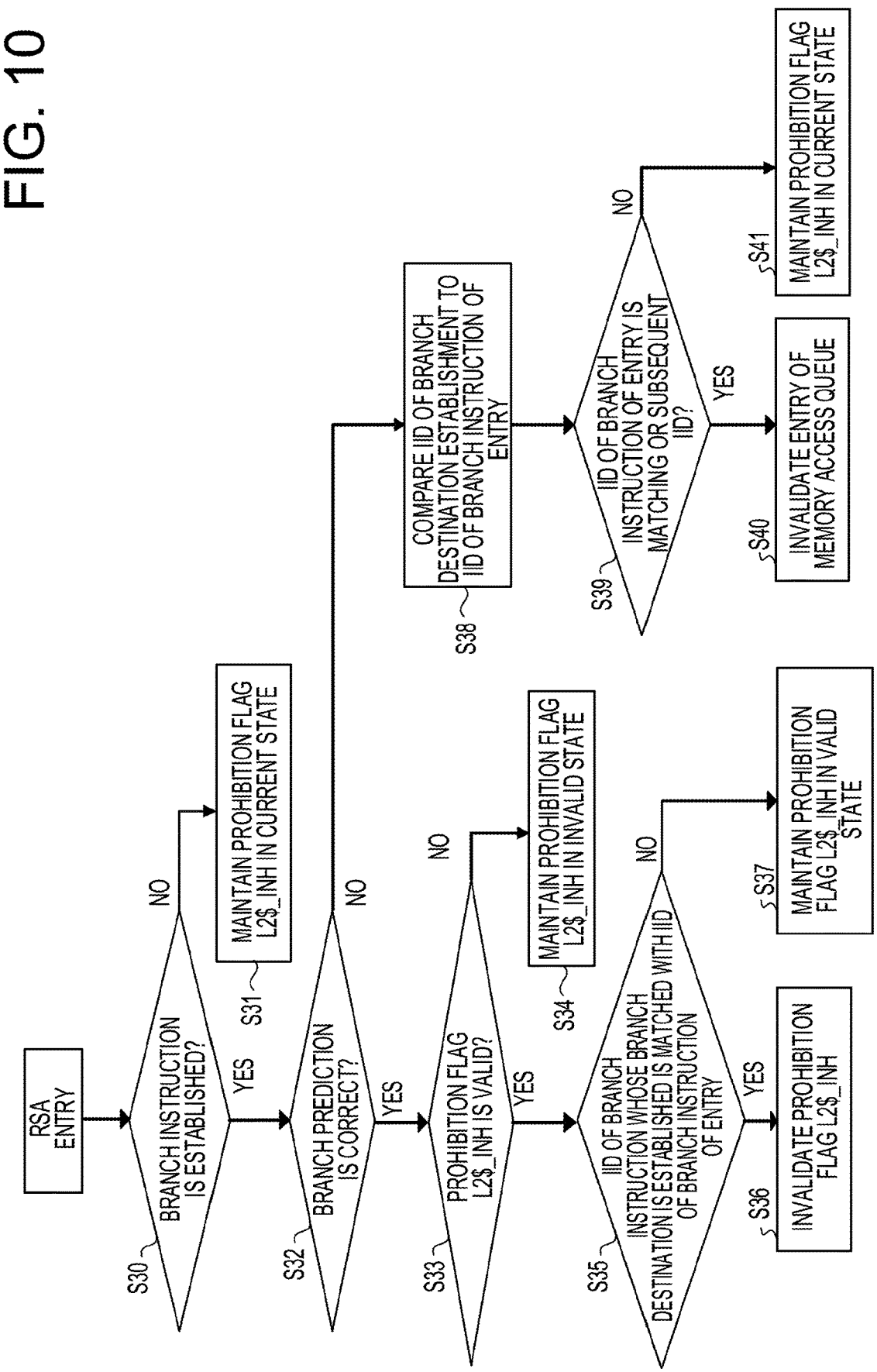
FIG. 10 is a flowchart illustrating a control on a prohibition flag L2$_INH in each entry in the RSA when branch establishment is made.

FIG. 10 is a flowchart illustrating a control on a prohibition flag L2$_INH in each entry in the RSA when branch establishment is made. Descriptions will be made on the control on the prohibition flag in the RSA in FIG. 9, at the time of branch establishment, with reference to FIG. 10.

When a branch instruction is not established ("NO" in S30), there is no branch establishment notification indicating that a branch destination of the branch instruction is established, from the RSBR, and a prohibition flag L2$_INH in an entry is maintained in the current state (S31). Meanwhile, when the branch instruction is established ("YES" in S30), a branch establishment notification BR_DTR is transmitted from the RSBR.

When the branch prediction of the branch establishment notification is correct ("YES" in S32), and then the prohibition flag of each entry is valid "1" ("YES" in S33), in a case where the comparison circuit 20 determines that an IID of the branch instruction whose branch destination is established, which is added to the branch establishment notification, matches an IID of the branch instruction in the entry, the RSA changes the prohibition flag L2$_INH in the entry to invalid "0" (S36). Accordingly, a memory access instruction in the entry becomes an instruction for non-speculative execution. The prohibition flag in the non-matching entry is maintained in a valid state (S37).

Meanwhile, when the branch prediction of the branch establishment notification is incorrect ("NO" in S32), the comparison circuit 20 compares the IID of the branch instruction whose branch destination is established, which is added to the branch establishment notification, to the IID of the branch instruction in the entry (S38). In a case where the IID of the branch instruction in the entry matches the IID of the branch instruction on which branch establishment is made or matches an IID of a branch instruction subsequent thereto ("YES" in S39), since this case indicates a failure in the speculation, the RSA invalidates a valid bit V in the entry (S40). Accordingly, the instruction of the invalidated entry is canceled. When the IID of the branch instruction in the entry does not match the IID of the branch instruction on which branch establishment is made or does not match an IID of a branch instruction subsequent thereto ("NO" in S39), the RSA maintains the prohibition flag in the entry, in the current state (S41).

<L1 Data Cache and Memory Access Queue Thereof>

Figure 11:
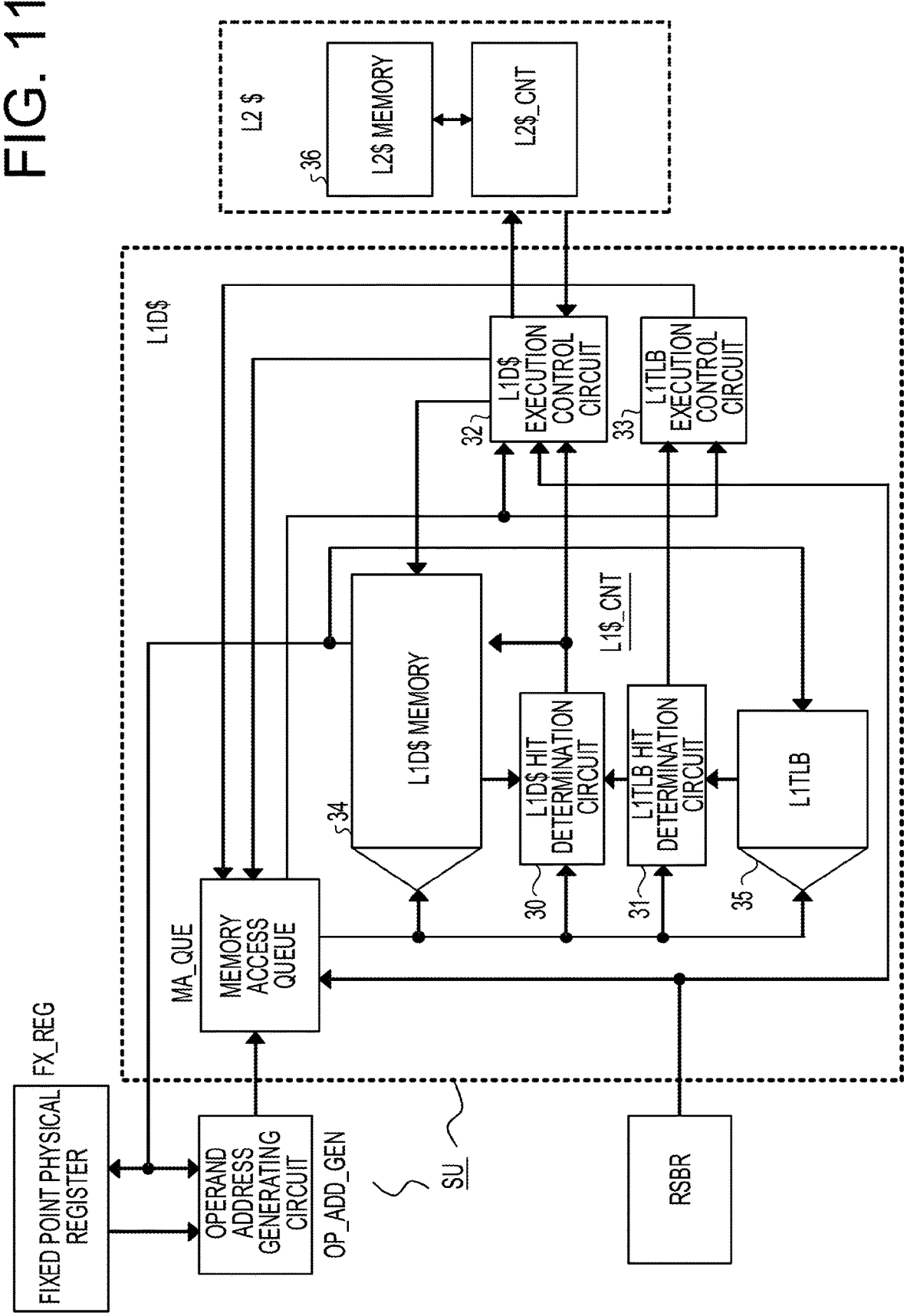
FIG. 11 is a view illustrating a configuration of an L1 data cache unit.

FIG. 11 is a view illustrating the configuration of an L1 data cache unit. The L1 data cache unit (hereinafter, simply referred to as an L1 data cache) L1D$ constitutes the storage unit SU, together with the operand address generating circuit OP_ADD_GEN. With respect to a memory access instruction issued from the RSA, an operand address is generated by the operand address generating circuit, and an entry is created in a memory access queue MA_QUE in the L1 data cache. In the entry, information of the memory access instruction, a prohibition flag L2$_INH, an IID of a branch instruction, and an L1 data cache miss flag L1D$_MISS indicating that cache miss has occurred in the L1 data cache as described below are registered (stored).

In the L1 data cache L1D$, an L1 data cache memory 34 and an L1TLB 35 are included. In the L1 data cache memory 34, a part of data in a memory is stored, together with tag information thereof. In the L1TLB 35, a part of an address conversion table in the memory is stored. Therefore, each of the L1 data cache memory 34 and the L1TLB 35 is a kind of cache memory in which a part of data in the memory is stored. Thus, both the L1 data cache memory 34 and the L1TLB 35 are searched on the basis of the operand address of the memory access instruction, and cache hit determination is made. When the cache hit determination is cache miss (cache miss in the L1 data cache memory 34 or cache miss in the L1TLB 35), a data request asking the L2 cache for data is issued, and update with the data acquired from the L2 cache is performed.

The L1 data cache unit L1D$ includes an L1 data cache control circuit L1D$_CNT that performs a cache control in response to the memory access instruction of the entry fed from the memory access queue. The L1 data cache control circuit L1D$_CNT includes an L1TLB cache hit determination circuit 31, an L1 data cache hit determination circuit 30, an L1TLB execution control circuit 33, and an L1 data cache execution control circuit 32.

When the entry in the memory access queue MA_QUE is fed (input) to a pipeline circuit of the L1 data cache control circuit L1D$_CNT, the L1 data cache control circuit L1D$_CNT reads tag data from the L1TLB 35 on the basis of the operand address. Then, the read data is sent to the L1TLB cache hit determination t circuit 31, and a L1TLB cache hit determination is made.

When a determination of an L1TLB cache miss is made, the L1TLB execution control circuit 33 determines whether to issue a data request asking the L2 cache for address conversion data.

When the prohibition flag L2$_INH of the fed entry is valid "1," the L1TLB execution control circuit 33 does not issue the data request to the L2 cache, interrupts the execution of the entry, and returns the entry to the memory access queue MA_QUE. When the prohibition flag L2$_INH is invalid "0," the data request is issued to the L2 cache, and the L1TLB 35 is updated with the address conversion data acquired from the L2 cache. When an update processing of the L1TLB is completed, the L1TLB execution control circuit returns the entry being executed to the memory access queue.

Meanwhile, when a determination of L1TLB cache hit is made, a converted address of the operand address is read from the L1TLB 35, and is sent to the L1 data cache hit determination circuit 30. Then, the L1 data cache hit determination circuit 30 reads tag data from the L1 data cache memory 34 on the basis of the operand address, and performs an L1 data cache hit determination on the basis of the tag data and the converted address.

In the case of data cache hit, the L1 data cache execution control circuit 32 reads data from the L1 data cache memory 34 as usual, and responds with data. By the data response, the read data is stored in a renaming register in the fixed point physical register file FX_REG.

Meanwhile, in the case of a data cache miss, the L1 data cache execution control circuit 32 determines whether to issue a data request asking the L2 cache for data.

When the prohibition flag L2$_INH of the fed entry is valid "1," the L1 data cache execution control circuit 32 does not issue the data request to the L2 cache, interrupts execution of the entry, and returns the entry to the memory access queue MA_QUE. When the prohibition flag L2$_INH is invalid "0," the data request is issued to the L2 cache, and the L1 data cache memory 34 is updated with the data acquired from the L2 cache. When an update processing of the L1 data cache memory is completed, the L1 data cache execution control circuit 32 returns the entry being executed to the memory access queue. When the entry is input again, data cache hit occurs in the L1 data cache memory 34, and then the L1 data cache control circuit reads data from the L1 data cache memory, and responds with data. Accordingly, the data is stored in a renaming register in the fixed point physical register file FX_REG.

The L2 cache unit L2$ includes an L2 cache memory 36 and an L2 cache control circuit L2$_CNT. The L2 cache control circuit processes the data request issued by the L1 data cache control circuit, and then reads data from the L2 cache memory 36 in the case of L2 cache hit or data from the main memory in the case of L2 cache miss, and responds with data to the L1 data cache execution control circuit 32 or the L1TLB execution control circuit 33 of the L1 data cache control circuit.

Figure 12:
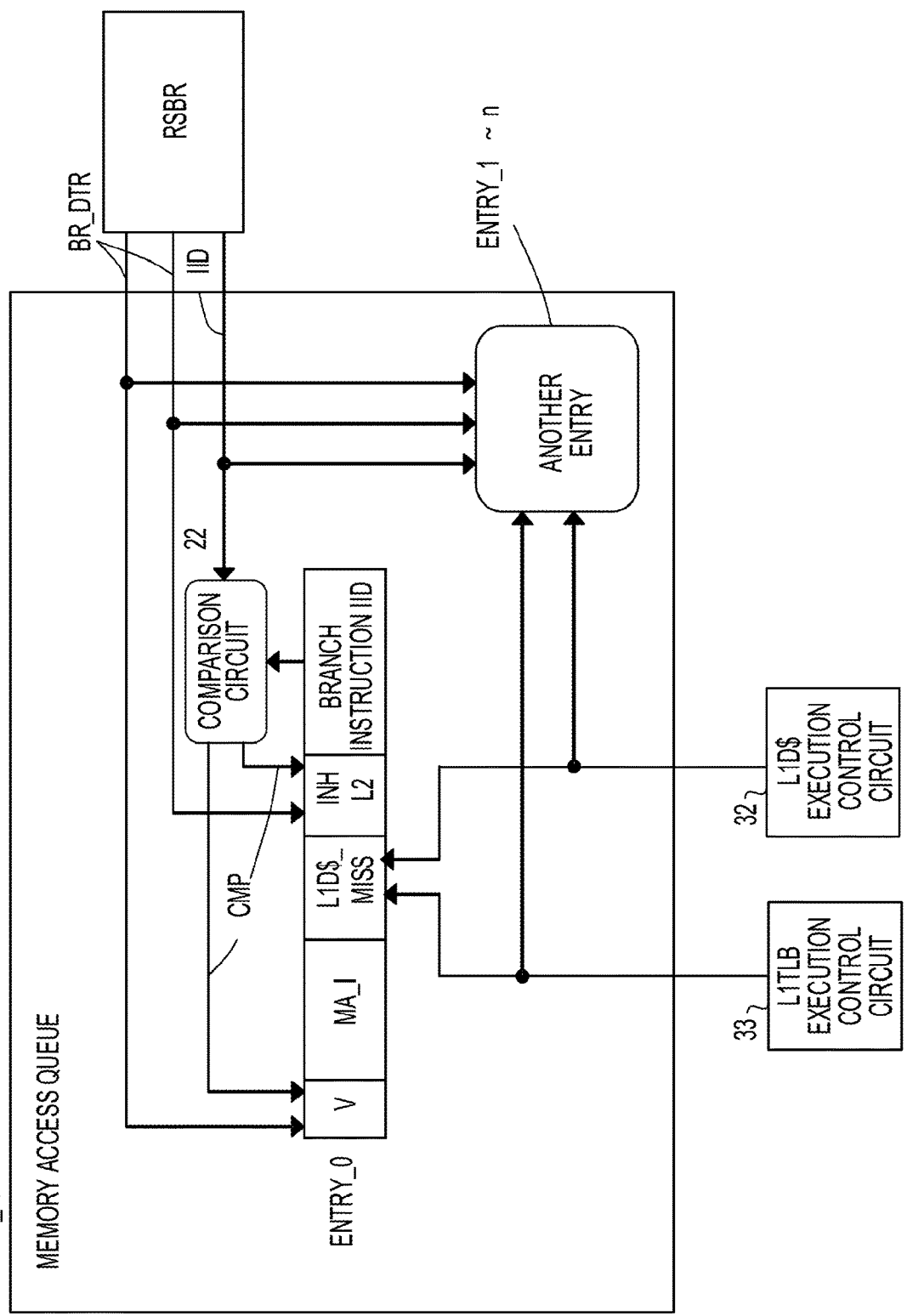
FIG. 12 is a view illustrating a configuration of a memory access queue.

FIG. 12 is a view illustrating a configuration of a memory access queue. The memory access queue MA_QUE has a plurality of entries ENTRY_0 to ENTRY_n, like the queue of the RSA. Meanwhile, in FIG. 12, only one entry ENTRY_0 is illustrated, and other entries ENTRY_1 to ENTRY_n are collectively illustrated. In each entry of the memory access queue, a comparison circuit 22 is provided, which compares an IID added to a branch establishment notification BR_DTR from the RSBR, to an IID in the entry.

In each entry of the memory access queue, a valid bit V, data of a memory access instruction MA_I, a prohibition flag L2$_INH, and an IID of a branch instruction are stored, and further, an L1 data cache miss flag L1D$_MISS indicating that the entry causes cache miss in the L1 data cache is stored unlike the queue of the RSA.

When the entry is created in the memory access queue, the valid bit V becomes valid "1," whereas when an execution processing of the entry is terminated, the valid bit V becomes invalid "0." The data of the memory access instruction MA_I, the prohibition flag L2$_INH, and the IID of the branch instruction are stored as they were when they were issued from the RSA. Meanwhile, the L1 data cache miss flag L1D$_MISS is in an invalid "0" state at the time of entry creation. Then, when the entry is executed, the L1 data cache miss flag L1D$_MISS is changed to valid "1" by each of the L1TLB execution control circuit 33 (in the case of TLB cache miss), and the L1 data cache execution control circuit 32 (in the case of data cache miss).

Once the L1 data cache miss flag L1D$_MISS is valid, the entry is not issued from the memory access queue as long as the prohibition flag L2$_INH is valid. This is because even though issued, the entry causes cache miss again, and then a data request to the L2 cache is suppressed and the entry is returned to the memory access queue. Then, when branch establishment of the branch instruction is made with success in the branch prediction and the prohibition flag becomes invalid, the entry is issued from the memory access queue.

As in the entry in the issue queue of the RSA, the prohibition flag L2$_INH of the entry in the memory access queue is controlled by the branch establishment notification BR_DTR from the RSBR. The control on the prohibition flag of the entry in the memory access queue due to the branch establishment of the branch instruction is performed in accordance with the flowchart in FIG. 10 in the same manner as in the entry in the issue queue of the RSA.

Detailed descriptions with reference to the flowchart in FIG. 10 will be repetitive and thus will not be made. Hereinafter, brief descriptions will be made. In the memory access queue, when a branch destination establishment notification of a branch instruction is received from the RSBR, in a case where the branch prediction is correct ("YES" in S32), the comparison circuit 22 of each entry compares an IID of the branch instruction of the branch establishment notification, to an IID of the branch instruction of the entry. Then, when the IID of the branch instruction of the branch establishment notification matches the IID of the branch instruction of the entry ("YES" in S35), the prohibition flag L2$_INH of the matching entry is changed from valid "1" to invalid "0" (S36). In a case where the branch prediction is incorrect ("NO" in S32), the comparison circuit 22 of each entry compares the IID of the branch instruction of the branch establishment notification, to the IID of the branch instruction of the entry. Then, when the IID of the branch instruction of the entry matches the IID of the branch instruction of the branch establishment notification or matches an IID of a branch instruction subsequent thereto ("YES" in S39), a valid bit V of the matching entry is set to invalid "0," and a memory access instruction of the entry is canceled (S40).

<Execution Processing of Memory Access Instruction in L1 Cache (First Example)>

Figure 13:
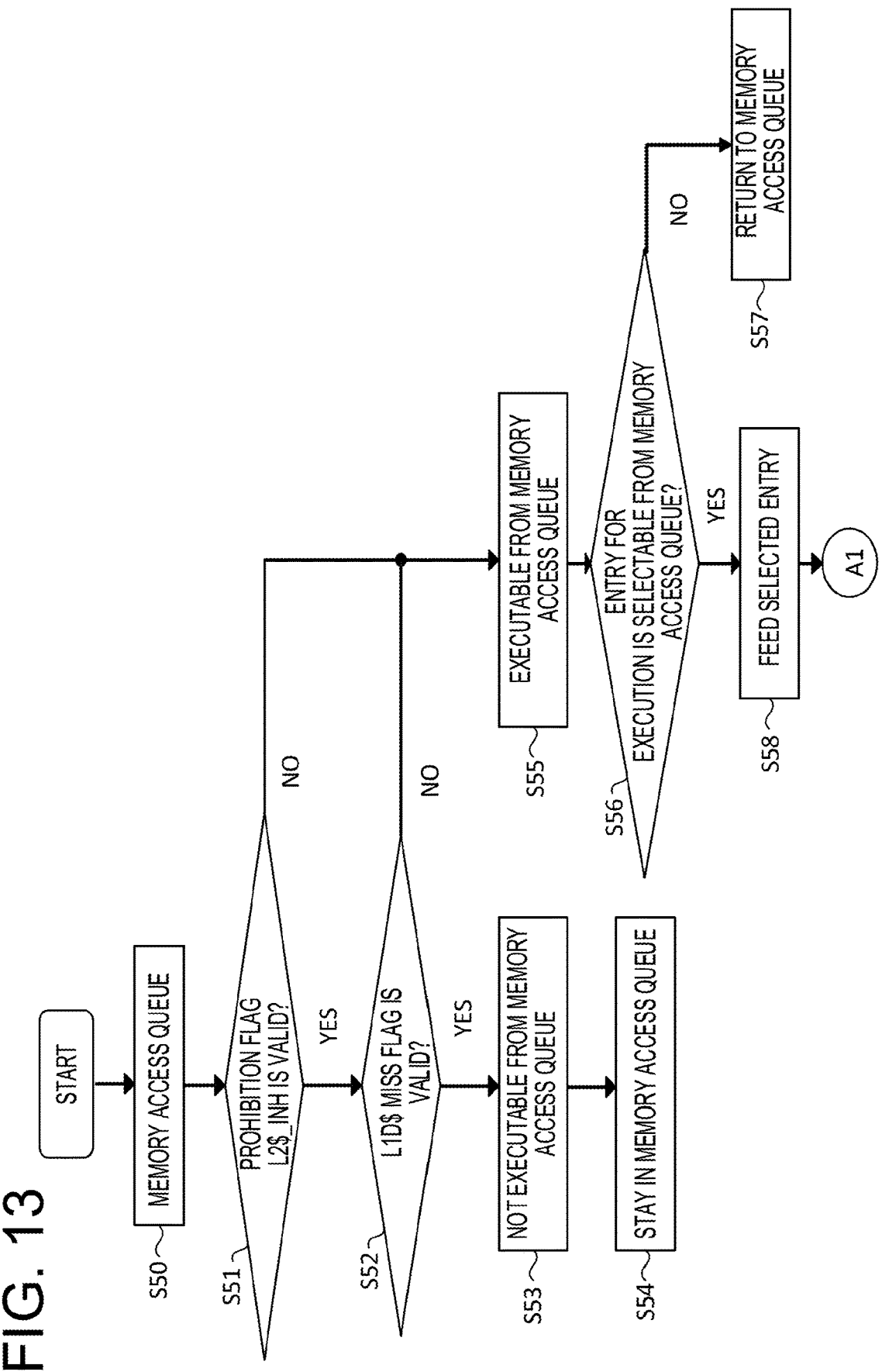
FIG. 13 is a flowchart illustrating a first example of an execution processing of a memory access instruction in an L1 cache.
Figure 14:
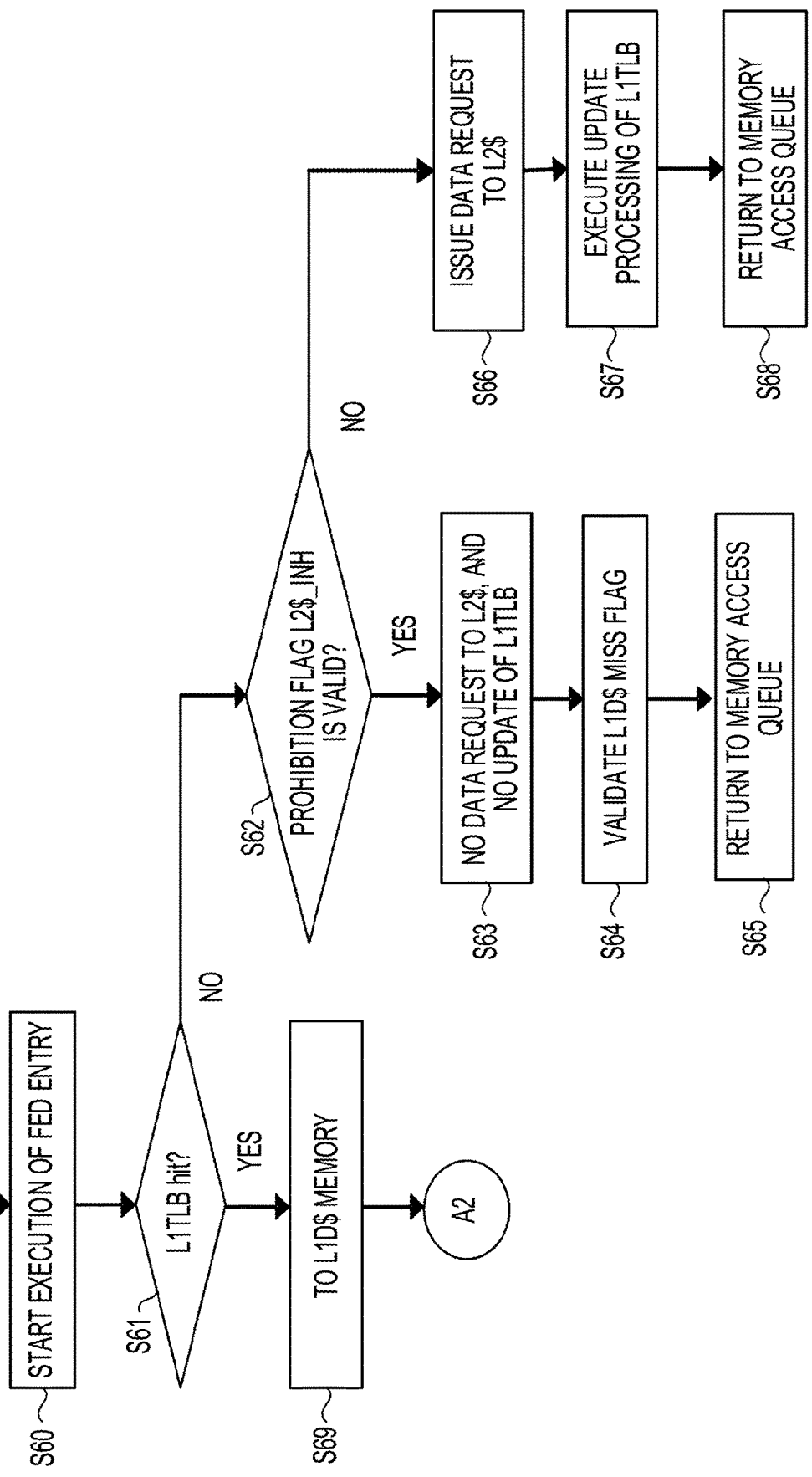
FIG. 14 is a flowchart illustrating the first example of the execution processing of the memory access instruction in the L1 cache.
Figure 15:
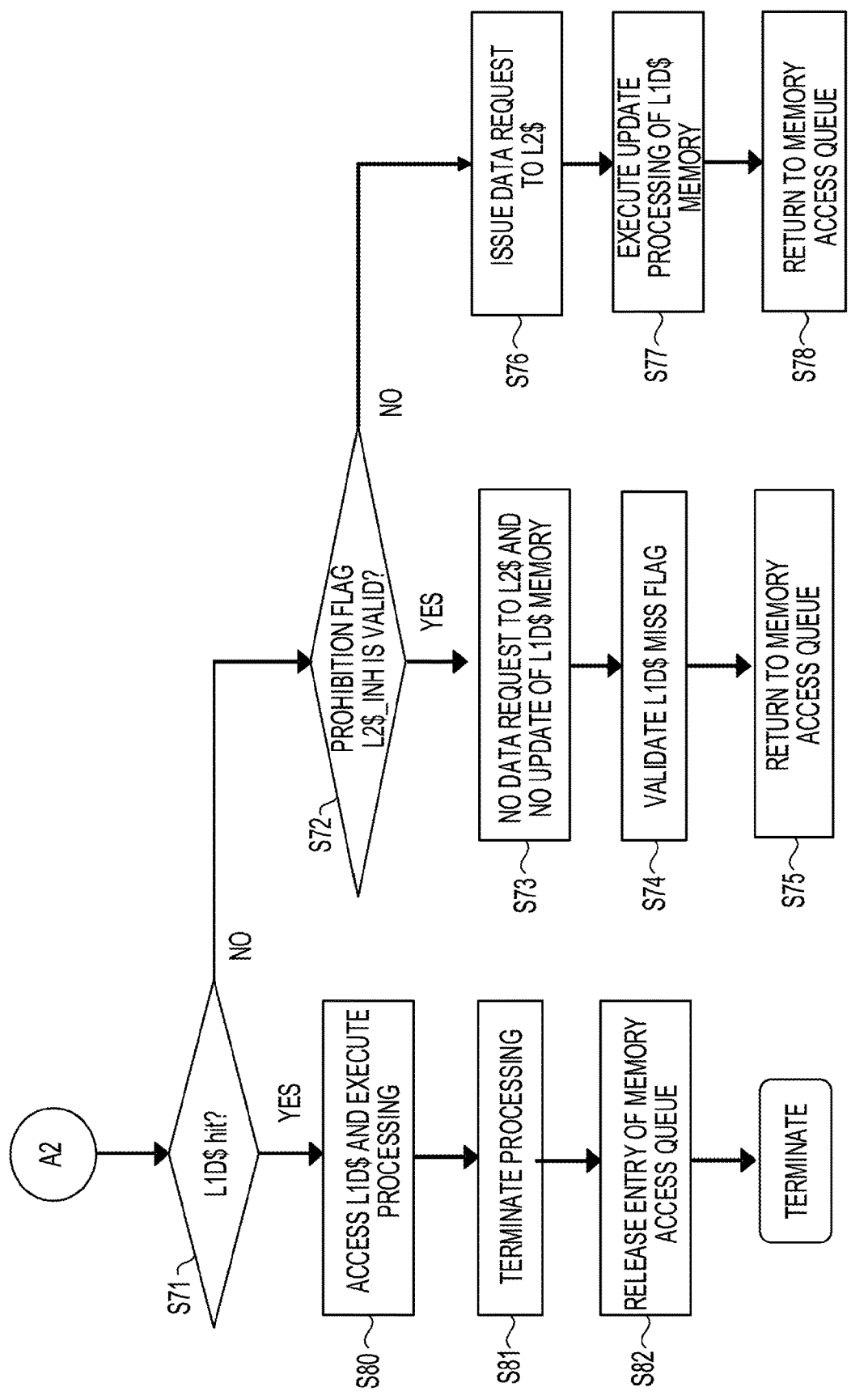
FIG. 15 is a flowchart illustrating the first example of the execution processing of the memory access instruction in the L1 cache.

FIGS. 13, 14, and 15 are flowcharts illustrating a first example of an execution processing of a memory access instruction in the L1 cache. FIG. 13 illustrates a feeding control of an entry, in a memory access queue of the L1 cache, FIG. 14 illustrates an L1TLB cache hit determination and a processing in a case where a TLB cache miss has occurred, in the L1 data cache control circuit, and FIG. 15 illustrates an L1 data cache hit determination and a processing on the L1 data cache memory, in the L1 data cache control circuit.

Descriptions will be made on a feeding control of an entry, in a memory access queue of the L1 data cache, with reference to FIG. 13. With respect to an entry of a memory access queue (S50), when a prohibition flag L2$_INH is valid "1" ("YES" in S51) and an L1 data cache miss flag L1D$_MISS is valid "1" ("YES" in S52), the entry is not executable (S53) and remains (stays) in the memory access queue (S54). Even though executed in the L1 data cache, the entry causes cache miss in the L1 data cache again, and is returned to the memory access queue. Thus, until the prohibition flag is invalidated due to a branch establishment, the entry is not fed from the memory access queue.

Meanwhile, with respect to the entry of the memory access queue (S50), when the prohibition flag L2$_INH is invalid "0" ("NO" in S51) or the L1 data cache miss flag L1D$_MISS is invalid "0" ("NO" in S52), the entry is executable from the memory access queue (S55). Therefore, when an executable entry is selectable from the memory access queue ("YES" in S56), the selected entry is fed (input) to the L1 data cache control circuit (S58). When the executable entry is not selectable ("NO" in S56), the entry stays in the memory access queue (S57). Here, a case where the executable entry is selectable is, for example, a case where there are a plurality of executable entries and an entry older than the corresponding entry is selected.

Subsequently, descriptions will be made on a control in the L1 data cache control circuit with reference to FIGS. 14 and 15. In FIG. 14, the L1 data cache control circuit starts an execution of the entry fed from the memory access queue (S60). First, the L1TLB cache hit determination circuit 31 of the L1 data cache control circuit performs a TLB cache hit determination on the L1TLB 35 (S61). In the case of TLB cache hit, the process proceeds to a data cache hit determination on the L1 data cache memory in FIG. 15 (S69).

In the case of a TLB cache miss ("NO" in S61), when the prohibition flag L2$_INH of the fed entry is valid ("YES" in S62), the L1TLB execution control circuit 33 does not issue a data request to the L2 cache, interrupts an execution processing of the entry (S63), validates the L1 data cache miss flag L1D$_MISS (S64), and returns the entry to the memory access queue (S65).

Meanwhile, when the prohibition flag L2$_INH is invalid ("NO" in S62), the L1TLB execution control circuit 33 issues a data request to the L2 cache, and updates the L1TLB 35 with data read from the L2 cache (data of an address conversion table) (S66). Then, the entry is temporarily returned to the memory access queue (S67). In this case, when the entry is fed again from the memory access queue, TLB cache hit occurs in the L1TLB 35.

After the TLB cache hit has occurred in the L1 data cache, in FIG. 15, the L1 data cache hit determination circuit 30 reads tag information of the L1 data cache memory to perform a data cache hit determination (S71). When it is determined that a data cache hit has occurred ("YES" in S71), the L1 data cache execution control circuit 32 reads data from the L1 data cache memory, and responds with data (S80). Accordingly, an execution processing of the entry is terminated (S81), and the entry is released from the memory access queue due to an invalidation of the valid bit V (S82).

Meanwhile, when it is determined that a data cache miss has occurred ("NO" in S71), in a case where the prohibition flag L2$_INH of the entry is valid ("YES" in S72), the L1 data cache execution control circuit 32 does not issue a data request to the L2 cache. Then, the L1 data cache execution control circuit 32 interrupts an execution processing of the entry (S73), validates the L1 data cache miss flag L1D$_MISS (S74), and returns the entry to the memory access queue (S75).

When the prohibition flag is invalid ("NO" in S72), the L1 data cache execution control circuit 32 issues a data request to the L2 cache, and updates the L1 data cache memory 34 with data (access destination data) read from the L2 cache (S76). Then, the entry is temporarily returned to the memory access queue (S77). In this case, when the entry is fed again from the memory access queue, data cache hit occurs in the L1 data cache memory. Then, data is read from the L1 data cache memory, data response is made, and the processing is terminated.

Figure 16:
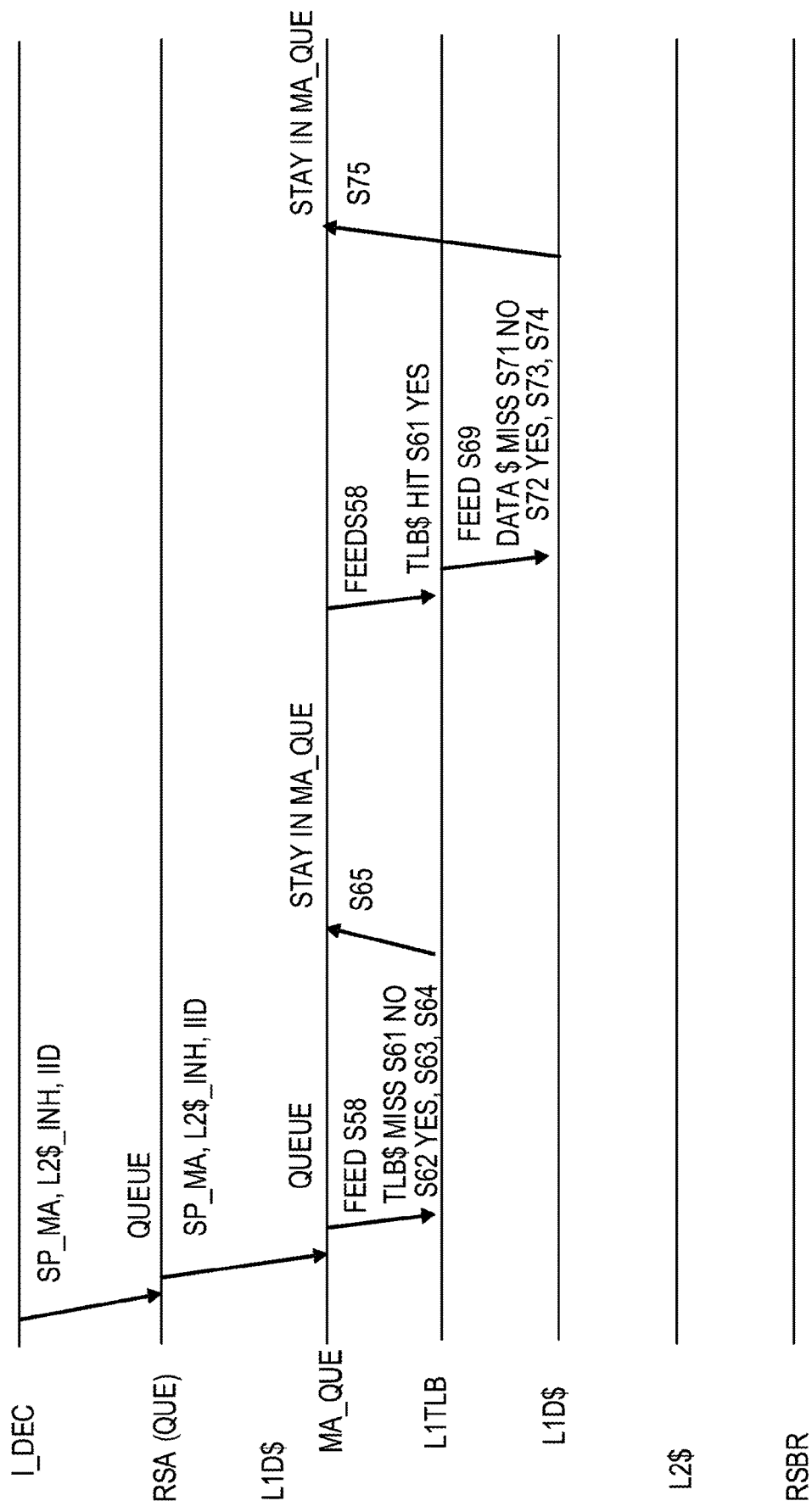
FIG. 16 is a sequence chart illustrating a processing in the processor, with respect to a memory access instruction speculatively executed during an unestablished branch state of a branch instruction.

FIG. 16 is a sequence chart illustrating a processing in a processor, with respect to a memory access instruction speculatively executed during an unestablished branch state of a branch instruction. In FIG. 16, the processing numbers in FIGS. 13 to 15 are additionally written. It is assumed that before the memory access instruction is speculatively executed, both the L1 data cache and the L1TLB are flashed, and all entries are in an invalid state. Further, it is assumed that the memory access instruction to be speculatively executed is the above described load instruction LOAD2 to be speculatively executed.

First, the instruction decoder I_DEC issues a memory access instruction SP_MA for a speculative execution to the RSA, and an entry is generated in an issue queue of the RSA. The RSA issues the memory access instruction SP_MA for speculative execution to the L1 data cache L1D$, and an entry is generated in a memory access queue MA_QUE of the L1 data cache. In each of the entry in the RSA and the entry in the memory access queue MA_QUE, information of the memory access instruction, a prohibition flag L2$_INH, and an IID of a branch instruction are registered. In the entry of the memory access queue, an L1 data cache miss flag L1D$_MISS is registered as invalid "0."

In the memory access queue MA_QUE, although the prohibition flag L2$_INH of the entry is valid ("YES" in S51), since the L1 data cache miss flag L1D$_MISS is invalid ("NO" in S52), the entry of the memory access instruction for speculative execution is selected ("YES" in S56), and is fed to the L1 data cache control circuit (S58).

The L1 data cache control circuit performs a TLB cache hit determination with respect to the L1TLB, and a TLB cache miss occurs ("NO" in S61). Since the prohibition flag L2$_INH is valid and a speculative execution is performed ("YES" in S62), a data request is not issued to the L2 cache, and a processing is interrupted. As a result, the L1TLB 35 is not updated (S63). The L1 data cache control circuit validates the L1 data cache miss flag L1D$_MISS of the entry (S64), and returns the entry to the memory access queue (S65). As a result, the entry stays in the memory access queue and is not issued ("YES" in S51, "YES" in S52, S53, and S54) until the branch instruction is established with success in the branch prediction and the prohibition flag L2$_INH of the entry is invalidated.

In the above-described TLB cache hit determination, when a TLB cache hit occurs ("YES" in S61), the L1 data cache hit determination circuit 30 performs a data cache hit determination and determines that a data cache miss has occurred ("NO" in S71). In this case, since the prohibition flag L2$_INH is valid ("YES" in S72), a data request is not issued to the L2 cache, and a processing is interrupted. As a result, the L1 data cache memory 34 is not updated (S73). The L1 data cache control circuit validates the L1 data cache miss flag L1D$_MISS of the entry (S74), and returns the entry to the memory access queue (S75). In this case as well, the entry is not issued from the memory access queue ("YES" in S51, "YES" in S52, S53, and S54) until the branch instruction is established with success in the branch prediction and the prohibition flag L2$_INH of the entry is invalidated.

As described above, even though the load instruction LOAD2 for a speculative execution is executed, when a TLB cache miss or a data cache miss has occurred, on the basis of validation of the prohibition flag L2$_INH, the L1 data cache control circuit does not issue a data request to the L2 cache, interrupts a processing, and does not update the L1TLB or the L1 data cache memory. Accordingly, after the load instruction LOAD2, even when a load instruction LOAD3 is repeated by changing an address, since the L1 data cache memory and the L1TLB in the L1 data cache are not updated by the load instruction LOAD2, the load instruction LOAD3 does not cause a TLB cache hit and a data cache hit. Then, a data request is issued to the L2 cache due to a cache miss, and thus a latency for the load instruction LOAD3 becomes extended. As a result, a latency difference between the load instruction LOAD3 addressed to the same address as the load instruction LOAD2 for speculative execution, and the load instruction LOAD3 addressed to a different address from the load instruction LOAD2 for speculative execution is hidden. For this reason, it is impossible to distinguish between a load instruction to an address of a secret value X and a load instruction to another address, and thus, the secret value X is prevented from being illegally acquired.

Figure 17:
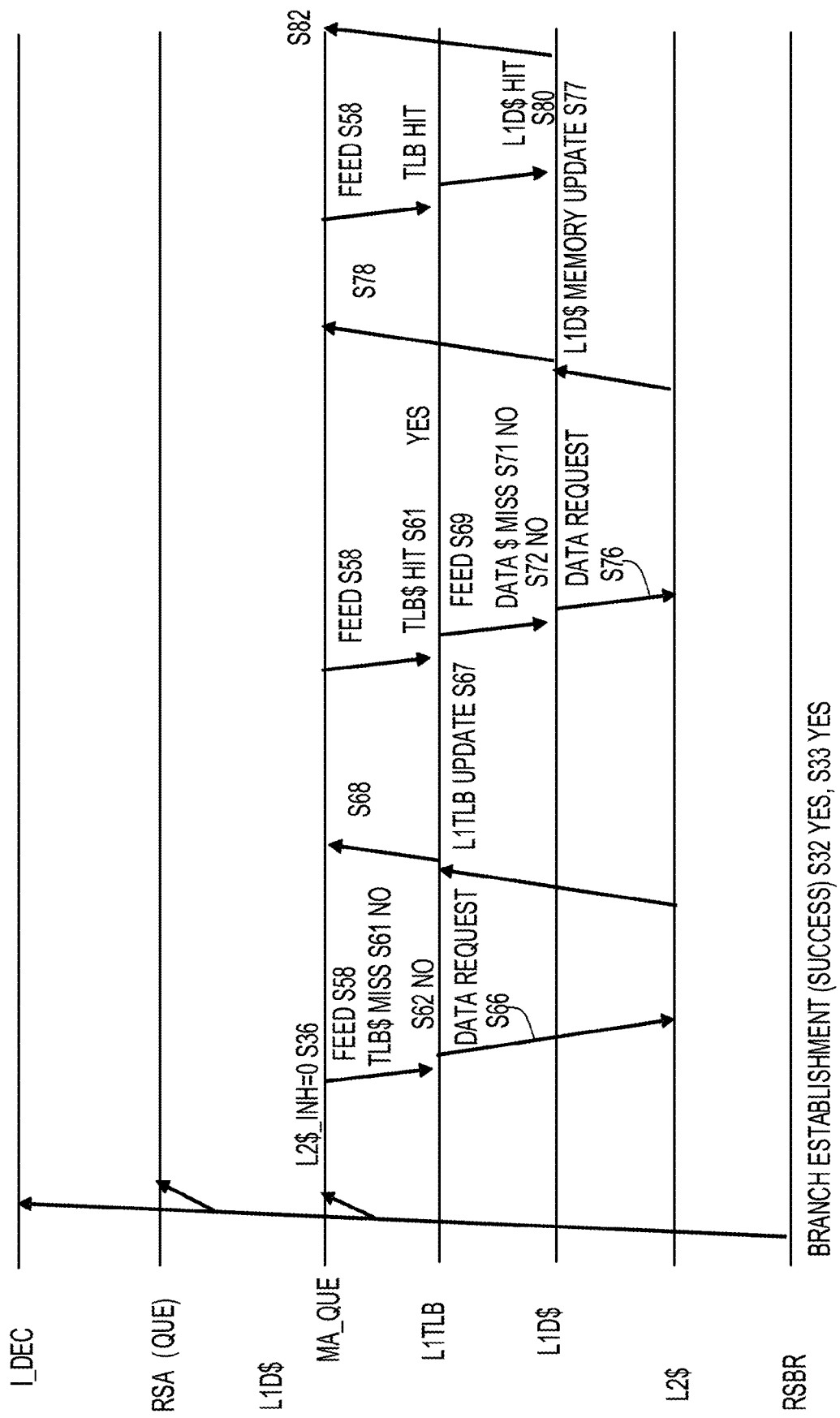
FIG. 17 is a sequence chart illustrating a processing in the processor, with respect to a memory access instruction non-speculatively executed after branch establishment of a branch instruction with success in a branch prediction.

FIG. 17 is a sequence chart illustrating a processing in a processor, with respect to a memory access instruction non-speculatively executed after branch establishment of a branch instruction with success in the branch prediction. As a premise, the RSBR transmits a branch establishment notification of a successful branch prediction, to the instruction decoder, an issue queue of the RSA, and a memory access queue of the L1 data cache. Here, the RSA causes an issuance of an entry of a memory access instruction to the memory access queue of the L1 data cache to be completed. In such a case, among entries in the memory access queue, a prohibition flag L2$_INH of an entry having an IID of a branch instruction which matches an IID of a branch instruction of the branch establishment notification becomes invalidated "0" (S36).

In this state, since the entry of the memory access queue is a memory access instruction for a non-speculative execution, and the prohibition flag is invalid ("NO" in S51), the entry is fed to the L1 data cache control circuit (S58). Then, in the L1 data cache control circuit, since the prohibition flag is invalid ("NO" in S62) when the L1TLB cache hit determination circuit determines that a TLB cache miss has occurred ("NO" in S61), a data request is issued to the L2 cache (S66), the L1TLB is updated (S67), and the entry is returned to the memory access queue (S68).

Thereafter, the entry is fed again (S58), and at this time, a TLB cache hit occurs ("YES" in S61). Then, since the prohibition flag is invalid ("NO" in S72) when it is determined that a data cache miss has occurred in the L1 data cache memory ("NO" in S71), a data request is issued to the L2 cache (S76), the L1 data cache memory is updated (S77), and the entry is returned to the memory access queue (S78).

The entry is fed again (S58), and at this time, a TLB cache hit occurs ("YES" in S61), a data cache hit occurs ("YES" in S71), data is read from the L1 data cache memory, and a data response is made (S80). As a result, a processing of the entry is terminated (S81), and the entry of the memory access queue is released (S82).

In a case where a branch state is not unestablished when the instruction decoder decodes a memory access instruction, the prohibition flag L2$_INH is invalid, and thus a memory data request is issued. An operation in such a case is the same as that in FIG. 17.

<Execution Processing of Memory Access Instruction in L1 Cache (Second Example)>

Figure 18:
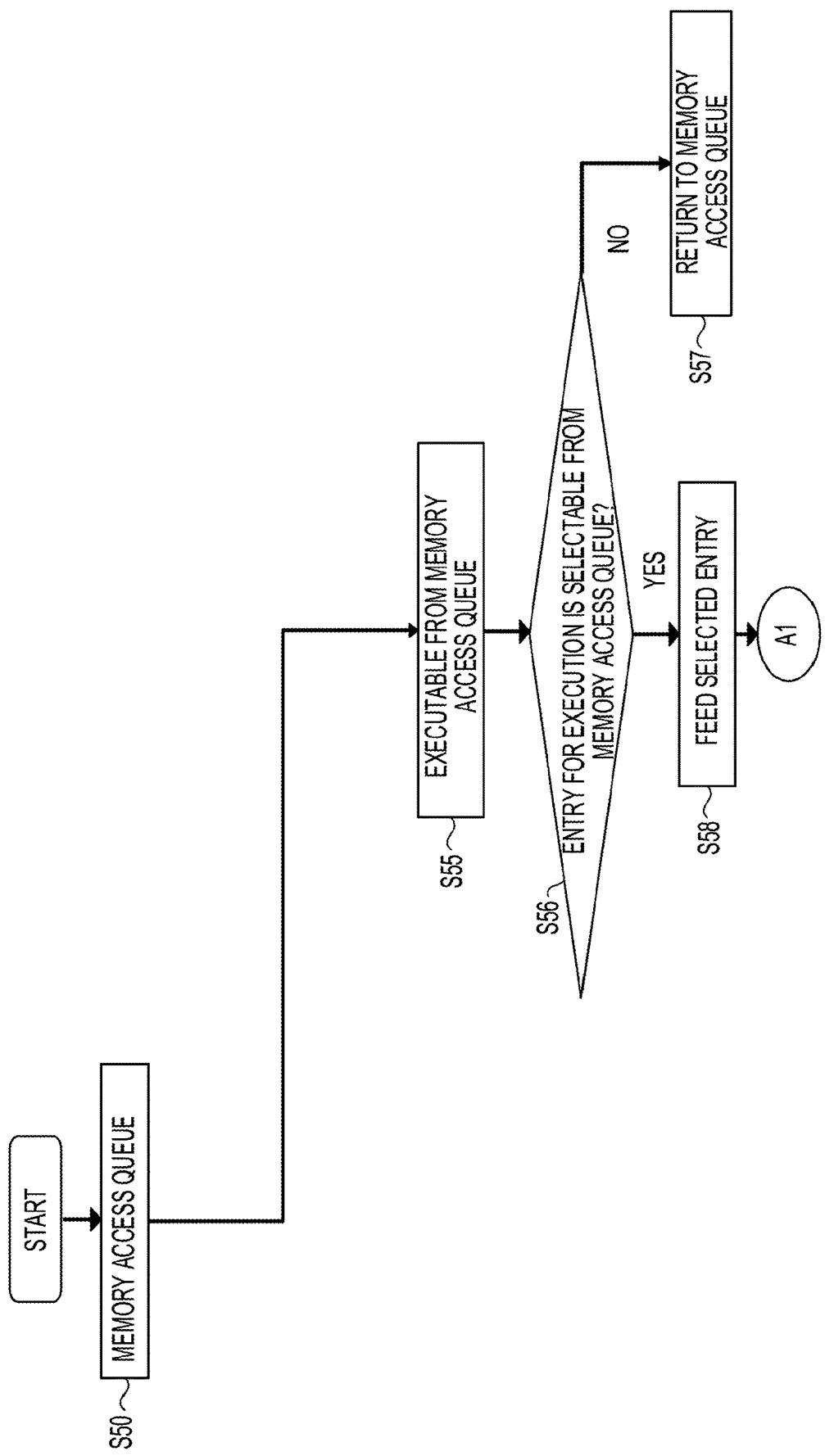
FIG. 18 is a flowchart of a second example of an execution processing of a memory access instruction in the L1 cache.
Figure 19:
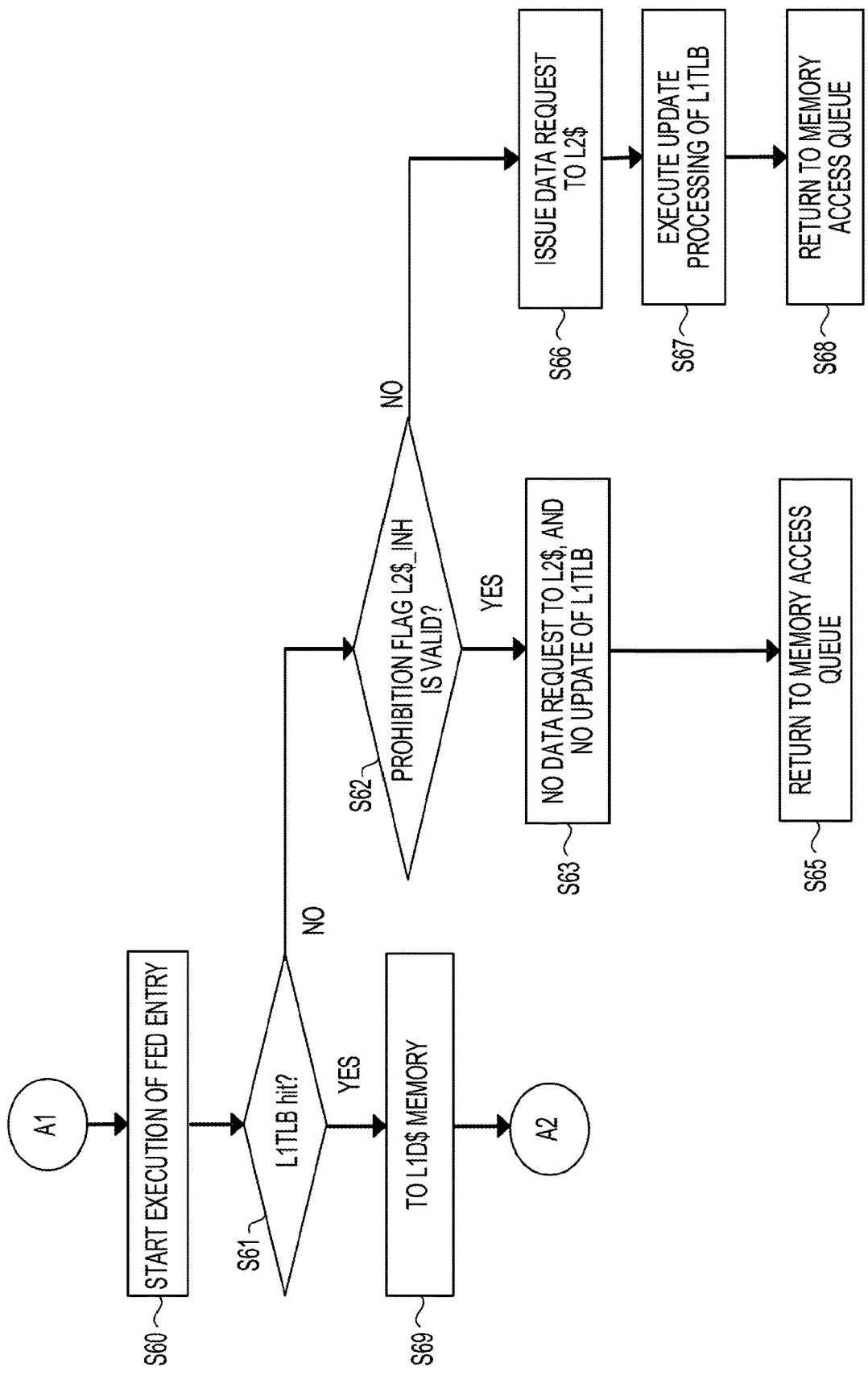
FIG. 19 is a flowchart of the second example of the execution processing of the memory access instruction in the L1 cache.
Figure 20:
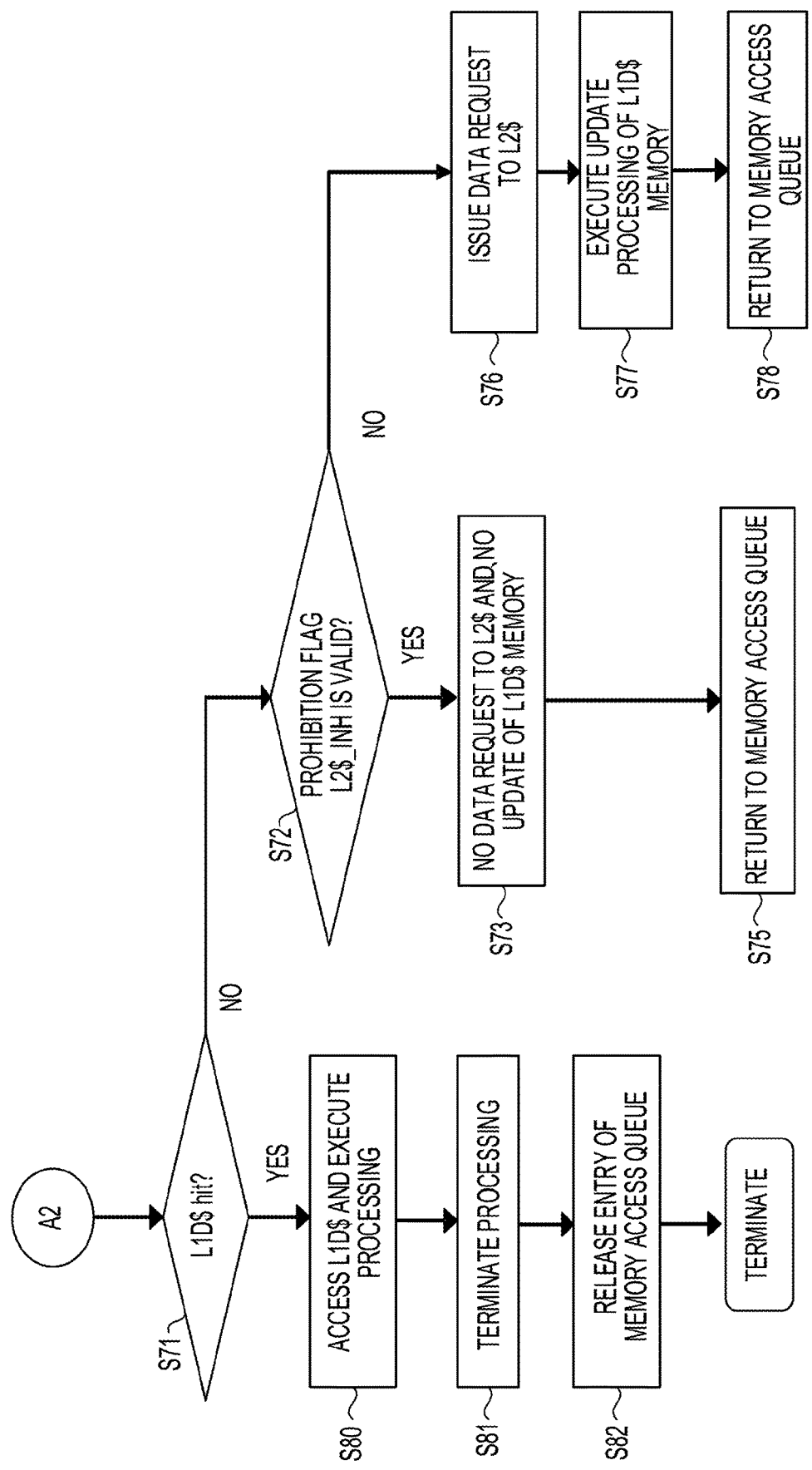
FIG. 20 is a flowchart of the second example of the execution processing of the memory access instruction in the L1 cache.

FIGS. 18, 19, and 20 are flowcharts of a second example of an execution processing of a memory access instruction in the L1 cache. FIG. 18 illustrates a feeding control of an entry in a memory access queue of the L1 cache, FIG. 19 illustrates an L1TLB cache hit determination and a processing in a case where a TLB cache miss has occurred in the L1 cache control circuit, and FIG. 20 illustrates an L1 data cache hit determination and a processing on the L1 data cache memory in the L1 cache control circuit.

In the second example, an L1 data cache miss flag is not stored in an entry of a memory access queue in the L1 data cache. Even when a TLB cache miss or a data cache miss occurs in the L1 data cache, a control of validating the L1 data cache miss flag and then staying the entry in the memory access queue is not performed.

In FIGS. 18, 19, and 20, only the processes different from those in FIGS. 13, 14, and 15 will be described. In FIG. 18, there is no processing of FIG. 13, in which in a case where the prohibition flag L2$_INH is valid (S51) and the L1 data cache miss flag L1D$_MISS is valid (S52), the entry is caused to stay in the memory access queue, and is not issued. Therefore, the entry in the memory access queue is executable, regardless of whether the prohibition flag L2$_INH is valid or invalid.

In FIG. 19, there is no processing S64 of FIG. 14, in which the L1 data cache miss flag is validated, and similarly, in FIG. 20, there is no processing S74 of FIG. 15, in which the L1 data cache miss flag is validated. Other processes in FIGS. 18, 19, and 20 are the same as those in FIGS. 13, 14, and 15.

In the second example, the L1 data cache miss flag is not stored in the entry of the memory access queue, and the above-described processes S64 and S74 are not present. Thus, the processing of the L1 data cache control circuit is simplified. However, when an entry of a memory access instruction for speculative execution is fed from the memory access queue to the L1 data cache control circuit, a processing of returning the entry to the memory access queue is repeated. Thus, there is a drawback in that a processing of a pipeline circuit of the L1 data cache increases.

As described above, according to the present embodiment, with respect to a memory access instruction speculatively executed during an unestablished branch state of a branch instruction, even when cache miss occurs in the L1 data cache, an issuance of a data request to the L2 cache is suppressed, and an update of the L1TLB or the L1 data cache memory in the L1 data cache is suppressed. Accordingly, it is possible to suppress a processor security vulnerability from increasing due to an attack using the fact that the L1TLB or the L1 data cache memory in the L1 data cache is updated by the load instruction LOAD2 speculatively executed with a malicious intention.

Meanwhile, with respect to a memory access instruction speculatively executed during an unestablished branch state of a branch instruction, when a cache hit occurs in the L1 data cache, an address conversion is performed in the L1TLB, and load data is read from the L1D$ memory or store data is written. In this case, the memory access instruction for speculative execution may be executed in the same manner as usual, and thus it is possible to prevent the performance of the memory access instruction for speculative execution from being lowered.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing apparatus comprising:
a decoder configured to issue an instruction;
a first cache memory;
a second cache memory; and
a processor configured to:
perform a cache hit determination on the first cache memory in response to a memory access instruction,
issue a data request to a second cache memory when the cache hit determination is a cache miss,
wherein when the memory access instruction is a memory access instruction for a speculative execution speculatively executed in a state where a branch destination of a branch instruction is unestablished, the decoder issues the memory access instruction by adding a valid prohibition flag and an instruction identifier of the branch instruction to the memory access instruction, and
the processor is configured to:
in a case where the cache hit determination is the cache miss and the prohibition flag of the issued memory access instruction is valid, not issue the data request to the second cache memory, and
in a case where the cache hit determination is a cache hit, acquire data from the first cache memory and make a response to the memory access instruction.

2. The arithmetic processing apparatus according to claim 1,
wherein the first cache memory is configured to correspond one or both of a data cache memory in which data is registered, and a translation lookaside buffer (TLB) cache memory in which a part of an address conversion table is stored.

3. The arithmetic processing apparatus according to claim 1, wherein the processor is configured to:
when the memory access instruction is a memory access instruction for a non-speculative execution executed after the branch destination of the branch instruction is established, issue the memory access instruction by adding an invalid prohibition flag,
in a case where the cache hit determination is the cache miss and the prohibition flag is invalid, issue the data request to the second cache memory, and
update the first cache memory.

4. The arithmetic processing apparatus according to claim 1, wherein the processor is configured to:
store the memory access instruction,
when the branch destination of the branch instruction is established, issue a branch establishment notification to which information indicating whether the branch prediction is successful and an identifier of the branch instruction are added,
when the branch prediction is successful, invalidate the prohibition flag of the memory access instruction having an identifier of the branch instruction that matches the identifier of the branch instruction added to the branch establishment notification, and
when the branch prediction is failed, invalidate the memory access instruction having an identifier of the branch instruction that matches or is subsequent to the identifier of the branch instruction added to the branch establishment notification.

5. The arithmetic processing apparatus according to claim 4, wherein the processor is configured to:
when the cache hit determination is the cache miss and the prohibition flag is invalid, update the first cache memory in accordance with the memory access instruction.

6. The arithmetic processing apparatus according to claim 4, wherein the processor is configured to:
execute an access control to the first cache memory with respect to the memory access instruction, and
when the cache hit determination is the cache miss and the prohibition flag is valid, issue the memory access instruction after the prohibition flag is invalidated after the cache miss.

7. The arithmetic processing apparatus according to claim 4, wherein the processor is configured to:
issue the memory access instruction to which the prohibition flag and the instruction identifier of the branch instruction are added,
store the memory access instruction,
in response to the branch establishment notification, when the branch prediction is successful, invalidate the prohibition flag of the memory access instruction having an identifier of the branch instruction that matches the identifier of the branch instruction added to the branch establishment notification, and
when the branch prediction is failed, invalidate the memory access instruction having an identifier of the branch instruction that matches or is subsequent to the identifier of the branch instruction added to the branch establishment notification.

8. A control method executed by a processor included in an arithmetic processing apparatus, the control method comprising:
performing a cache hit determination on the first cache memory in response to a memory access instruction;
issuing a data request to a second cache memory when the cache hit determination is a cache miss;
wherein when the memory access instruction is a memory access instruction for a speculative execution speculatively executed in a state where a branch destination of a branch instruction is unestablished, issuing the memory access instruction by adding a valid prohibition flag and an instruction identifier of the branch instruction to the memory access instruction;

in a case where the cache hit determination is the cache miss and the prohibition flag of the issued memory access instruction is valid, not issuing the data request to the second cache memory; and in a case where the cache hit determination is a cache hit, acquiring data from the first cache memory and making a response to the memory access instruction.

\* \* \* \* \*